United States Patent
Roeland et al.

(10) Patent No.: US 9,706,472 B2
(45) Date of Patent: Jul. 11, 2017

(54) METHOD AND ARRANGEMENT FOR RELOCATING PACKET PROCESSING FUNCTIONS

(71) Applicant: TELEFONAKTIEBOLAGET L M ERICSSON (PUBL), Stockholm (SE)

(72) Inventors: Dinand Roeland, Sollentuna (SE); Conny Larsson, Åkersberga (SE); Gunnar Mildh, Sollentuna (SE); Rashmi Purushothama, Sundbyberg (SE); Johan Rune, Lidingö (SE); Zoltán Turányi, Szentendre (HU); András Zahemszky, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 135 days.

(21) Appl. No.: 14/421,579

(22) PCT Filed: Dec. 17, 2014

(86) PCT No.: PCT/EP2014/078307
§ 371 (c)(1),
(2) Date: Feb. 13, 2015

(87) PCT Pub. No.: WO2016/095998
PCT Pub. Date: Jun. 23, 2016

(65) Prior Publication Data
US 2016/0345238 A1    Nov. 24, 2016

(51) Int. Cl.
*H04W 36/00* (2009.01)
*H04W 40/36* (2009.01)
(Continued)

(52) U.S. Cl.
CPC ........... *H04W 40/36* (2013.01); *H04L 5/0055* (2013.01); *H04L 45/38* (2013.01); *H04L 69/16* (2013.01);
(Continued)

(58) Field of Classification Search
None
See application file for complete search history.

(56) References Cited

U.S. PATENT DOCUMENTS

2010/0027497 A1    2/2010    Pelletier
2010/0085962 A1    4/2010    Issaeva
(Continued)

FOREIGN PATENT DOCUMENTS

EP    2835953 A1    2/2015
WO    2014032233 A1    3/2014

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.1.0, Dec. 2014, 310 pages.
(Continued)

*Primary Examiner* — Erika Washington
(74) *Attorney, Agent, or Firm* — Rothwell, Figg, Ernst & Manbeck, P.C.

(57) ABSTRACT

The invention relates to a method in an arrangement of a communication network, controlling a function for processing data packets of a flow associated with a device. The method comprises determining (610) to relocate the function for processing the data packets from a source instance to a target instance for the device, controlling (620) transmission of an instruction to the source instance to relocate the function for processing the data packets to the target instance, and controlling (630) an update of a switching element in a chain of functions for processing the data
(Continued)

packets of the flow comprising said function. The switching element affects the routing of the data packets of the flow in the chain. The switching element is updated with information related to the relocated function. The invention also relates to a method performed by the source instance and to the arrangement and the source instance.

55 Claims, 17 Drawing Sheets

(51) Int. Cl.
    *H04W 36/08* (2009.01)
    *H04L 12/721* (2013.01)
    *H04L 5/00* (2006.01)
    *H04L 29/06* (2006.01)
(52) U.S. Cl.
    CPC ........ *H04W 36/0011* (2013.01); *H04W 36/08* (2013.01)

(56) References Cited

U.S. PATENT DOCUMENTS

| 2013/0012192 A1* | 1/2013 | Xi ................... H04W 36/0055 455/422.1 |
| 2014/0259012 A1 | 9/2014 | Nandlall et al. |
| 2014/0280898 A1 | 9/2014 | Voit et al. |

OTHER PUBLICATIONS

3GPP, "3rd Generation Partnership Project; Technical Specification Group Services and System Aspects; Architecture enhancements for non-3GPP accesses (Release 13)", 3GPP TS 23.402 V13.0.0, Dec. 2014, 290 pages.

Valtulina, L., et al., "Performance Evaluation of a SDN/Open Flow-Based Distributed Mobility Management (DMM) Approach in Virtualized LTE Systems", 2014 IEEE Glovecom Workshops (GC WKSHPS), IEEE, Dec. 8, 2014, pp. 18-23, XP032747740.

Maini, E., et al., "A Compositional Modelling Approach for Live Migration in Software Defined Networks", 2014 International Conference and Workshop on the Network of the Future (NOF), IEEE, vol. Workshop, Dec. 3, 2014, pp. 1-6, XP032783623.

Taleb, T., et al., "Follow-Me Cloud: An Open Flow-based Implementation", 2013 IEEE International Conference on Green Computing and Communications and IEEE Internet of Things and IEEE Cyber, Physical and Social Computing, IEEE, Aug. 20, 2013, pp. 240-245, XP032530729.

International Search Report and Written Opinion issued on Jul. 16, 2015 in International application No. PCT/EP2014/078307, 9 pages.

Office Action issued in U.S. Appl. No. 14/765,677 dated Dec. 2, 2016, 13 pages.

Reply to Non-Final Office Action in U.S. Appl. No. 14/765,677, dated Mar. 1, 2017, 19 pages.

Bifulco et al., "Scalability of a Mobile Cloud Management System", Mobile Cloud Computing, ISBN 978-1-4503-1519-7 Aug. 2012, pp. 17-22.

Georg Hampel et al., "Applying Software-Defined Networking to the Telecom Domain", IEEE, 16th IEEE Global Internet Symposium, XP032436447, Apr. 2013, pp. 133-138.

International Search Report and Written Opinion issued in International Application No. PCT/EP2015/050380 dated Sep. 28, 2015, 11 pages.

* cited by examiner

METHOD AND ARRANGEMENT FOR RELOCATING PACKET PROCESSING FUNCTIONS

CROSS REFERENCE TO RELATED APPLICATION(S)

This application is a 35 U.S.C. §371 National Phase Entry Application from PCT/EP2014/078307 filed Dec. 17, 2014, the disclosure of which is incorporated by reference.

TECHNICAL FIELD

The disclosure relates to an arrangement of a communication network controlling a function for processing data packets of a flow associated with a device and to a source instance of the function in the communication network. The disclosure relates more specifically to methods and apparatus for relocating the function for processing the data packets of the flow from the source instance to a target instance of the communication network.

BACKGROUND

Long Term Evolution (LTE) is the fourth-generation (4G) wireless communication technologies standard developed within the 3rd Generation Partnership Project (3GPP) to improve the Universal Mobile Telecommunication System (UMTS) standard. The Evolved Universal Terrestrial Radio Access Network (E-UTRAN) is the RAN of an LTE system. In an E-UTRAN, a User Equipment (UE) is wirelessly connected to a Base Station (BS) commonly referred to as an evolved NodeB (eNodeB or eNB) in LTE. A BS is a general term for a network node capable of transmitting radio signals to a wireless device and receiving signals transmitted by the wireless device.

System Architecture Evolution (SAE) is the core network architecture of 3GPP's LTE wireless communication standard. The SAE has a flat, all-Internet Protocol (IP) architecture with separation of control plane and user plane/data traffic. The main component of the SAE architecture is the Evolved Packet Core (EPC), also known as SAE Core. Some important subcomponents of the EPC are Mobility Management Entity (MME) which is the key control node for the LTE access-network, Serving Gateway (SGW) which routes and forwards user data packets, Packet data network Gateway (PGW) providing connectivity from the UE to external packet data networks by being the point of exit and entry of traffic for the UE and acting as the mobility anchor for the user plane during inter-eNodeB handovers and as the anchor for mobility between LTE and other 3GPP technologies, and Home Subscriber Server (HSS) which is a central database that contains user-related and subscription-related information.

A communications network, which may be a wireless communication network, can be viewed in many ways. One way is a deployment view, where deployment refers to the physical placement of network equipment. Equipment is placed at sites. FIG. 1a shows such sites and how they may be connected.

End user devices are not illustrated in FIG. 1a. However, a device may be connected to the network, e.g., via a base station illustrated by an antenna icon, via a small cell and distributed radio (DR), or via a fixed line or a WiFi link illustrated in the FIG. 1a by a house icon or an office icon. Traffic is carried through an aggregation network, where Ac in the FIG. 1a is used for access sites and Ag is used for aggregation sites. Access and aggregations sites are often called hub sites or central office sites. Further aggregation may be done through a backbone network (BB) towards centralized data centers (DC). Some of these data centers may also act as a primary site (P). Some data centers, illustrated as the globe icons in FIG. 1a, may also do peering towards external Internet. Note that site naming is not standardized and may differ between operators. The naming above is just one example.

The deployment may be visualized in another way, illustrated in FIG. 1b. Different network services are mapped to different sites in this view. The services are here the network nodes of the 3GPP Evolved Packet Core (EPC) architecture as defined in the 3GPP standard (TS 23.401). Local sites may host antennas and eNBs. Regional sites are mainly used for aggregation. National sites host core network nodes like MME, SGW, PGW and Policy and Charging Control Function (PCRF). Some national sites may act as primary sites hosting user subscription information in a HSS.

To give an example, a large operator with more than 100 million subscribers spanning a large country may have 50000 BS sites, 150 central office sites, 25 regional data centers and 5 national data centers where each national data center also does peering towards external Internet. A BS site spans a couple of thousands of end users in a city district, a central office site spans a larger city, a regional data center spans a few million users in a part of a large state or in a number of small states, and a national data center spans tens of millions of users in a complete region of the country.

The current 3GPP EPC architecture is an anchored architecture. This means that all traffic of an Access Point Name (APN) of a user device needs to pass through one and the same PGW. With such architecture and a deployment as described above, it will be clear that the traffic in the network will follow a topological tree structure. The leaves of the tree are the end devices, the branches are the local and regional sites, and the trunk is the national data center hosting the PGW. Traffic from one end device to another end device will have to pass at least one, sometimes even two, PGWs. This also means that there may be a large latency in the transport of the packets, even if the two end devices are physically close to each other. The PGW may be hosted in a national data center physically far from the end devices. This applies also when one of the devices is located in another network, e.g. a server on the Internet.

IP networks use address aggregation to achieve routing scalability. This results in IP addresses having location significance in the network. That is, when a device with an IP address moves, it is not easy to reflect the change of the location of its IP address in the routing system. This is usually solved by allocating a fixed-location anchor point to the device managing its IP address. The anchor would then tunnel the traffic incoming to the device to the current location of the device. Mobile IP or General Packet Radio Service (GPRS) Tunneling Protocol (GTP) are protocols doing this. In the following, the place in the network topology where the IP address of the device is advertised is called an IP Advertisement Point (IAP). In today's mobile and fixed networks the IAP of the end user device, sometimes referred to as the UE, is typically anchored in a node as already mentioned above. In an anchored architecture, the IAP acts as anchor and is located in e.g. the PGW or a Broadband Network Gateway (BNG) for as long as the UE is using that IP address. The UE may e.g. use the IP address until the UE detaches or the IP address is released or re-assigned e.g. using Dynamic Host Configuration Protocol (DHCP).

All incoming traffic to the UE needs to go through the IAP, meaning the placement of the IAP in relation to the UE and its communication peer will determine how optimal the packet routing will be towards the UE. I.e. if the IAP is placed close to the UE, traffic from different sources can take a fairly optimal route to the IAP and the UE, if the IAP is far away from the UE, e.g. located on some core site, the traffic routing will often be less optimal. The drawback though of placing the IAP more distributed, i.e. closer to the UE, appears when the devices such as a wireless UE moves in the network. At that time the routing, although initially optimal, could become sub-optimal after some UE mobility. This is illustrated in the FIGS. 2a-d. In FIG. 2a, the IAP is placed in a central location. Routing of IP flow 1 is optimal but routing of IP flow 2 is sub-optimal. In FIG. 2b, the IAP is placed in a distributed location, leading to more efficient routing for both flows in the static case, i.e. when the UE is not moving. However, in FIG. 2c the IAP is also placed in a distributed location, leading to less efficient routing for both flows in the case of a mobile UE, and in FIG. 2d, the IAP is again placed in a central location, which in the mobility case leads to a more efficient routing for both flows in this example.

FIGS. 2a-2d thus illustrates how the placement of the anchor point or the IAP can support optimized routing. Moving an anchor is not possible. However, multiple IAPs may announce the same IP address. In such anchorless setup, optimized routing can be achieved by using that IAP that is on the optimal routing path. There may be one or more functions for processing data packets of a flow associated with a device or UE which are on the routing path UE-IAP-peer. If the data packets of the flow after movement of the UE start to go through a different path, and possibly via a different IAP, then those functions may still be on a sub-optimal routing path. Hereinafter, the term functions for processing data packets is equivalent to the term packet processing functions. Examples of packet processing functions are firewall, Network Address Translation (NAT), charging functions, policy functions, and lawful interception function.

SUMMARY

It is therefore an object to address some of the problems outlined above, and to provide a solution for enabling relocation of functions for processing data packets of a flow associated with a device. This object and others are achieved by the methods and the apparatus according to the independent claims, and by the embodiments according to the dependent claims.

In accordance with a first aspect, a method for an arrangement of a communication network is provided. The arrangement controls a function for processing data packets of a flow associated with a device. The method comprises determining to relocate the function for processing the data packets from a source instance to a target instance for the device. The method also comprises controlling transmission of an instruction to relocate the function for processing the data packets to the target instance. The instruction is transmitted to the source instance, optionally via the target instance. The method further comprises controlling an update of a switching element in a chain of functions for processing the data packets of the flow. The chain comprises said function. The switching element affects the routing of the data packets of the flow in the chain. The switching element is updated with information related to the relocated function.

In accordance with a second aspect, a method for relocating a function for processing data packets of a flow associated with a device, from a source instance to a target instance of a communication network, is provided. The function for processing the data packets of the flow is controlled by an arrangement of the communication network. The method is performed in the source instance and comprises receiving an instruction to relocate the function for processing the data packets to the target instance, the instruction being received from the arrangement controlling the function. The method also comprises performing the relocation to the target instance in response to the instruction.

In accordance with a third aspect, an arrangement for a communication network is provided. The arrangement is configured to control a function for processing data packets of a flow associated with a device. The arrangement is further configured to determine to relocate the function for processing the data packets from a source instance to a target instance for the device. The arrangement is also configured to control transmission of an instruction to relocate the function for processing the data packets to the target instance. The instruction is transmitted to the source instance. The arrangement is further configured to control an update of a switching element in a chain of functions for processing the data packets of the flow, the chain comprising said function. The switching element affects the routing of the data packets of the flow in the chain. The switching element is updated with information related to the relocated function.

In accordance with a fourth aspect, a source instance for a communication network is provided. The source instance is configured to relocate a function for processing data packets of a flow associated with a device to a target instance of the communication network. The function for processing the data packets of the flow is controlled by an arrangement of the communication network. The source instance is configured to receive an instruction to relocate the function for processing the data packets to the target instance, the instruction being received from the arrangement controlling the function. The source instance is also configured to perform the relocation to the target instance in response to the instruction.

In accordance with further aspects, a first computer program is provided. The first computer program comprises computer readable code which when run on the arrangement causes the arrangement to perform a method in accordance with the first aspect above. A first computer program product is also provided comprising a computer readable medium and the first computer program stored on the computer readable medium. Furthermore, a second computer program is provided. The second computer program comprises computer readable code which when run on the source instance causes the source instance to perform a method in accordance with the second aspect above. A second computer program product is also provided comprising a computer readable medium and the second computer program stored on the computer readable medium.

An advantage of the different aspects above is that a more optimal routing of data packets of a flow associated with a device can be achieved in the case of mobility of the device. In an anchorless architecture such as the one suggested in embodiments of the present invention, all functions processing data packets of the flow can be relocated, even the one(s) that would normally constitute an anchor.

Another advantage of the different aspects above is that different packet processing functions can be relocated to provide better load balancing or better performance, e.g. a shorter Round Trip Time (RTT).

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Figure 1A:
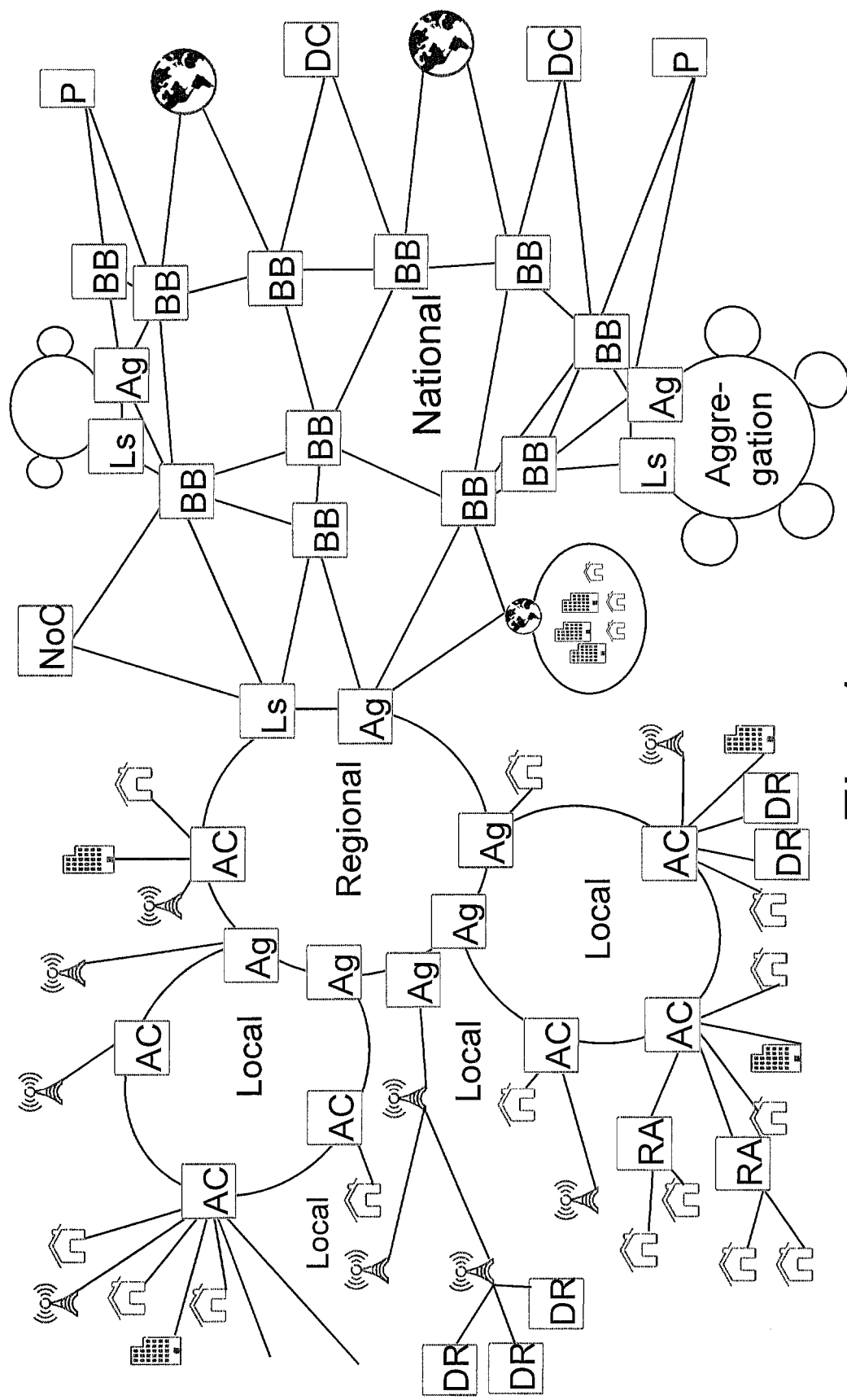
FIG. 1a is a schematic illustration of a deployment view of a communication network.
Figure 1B:
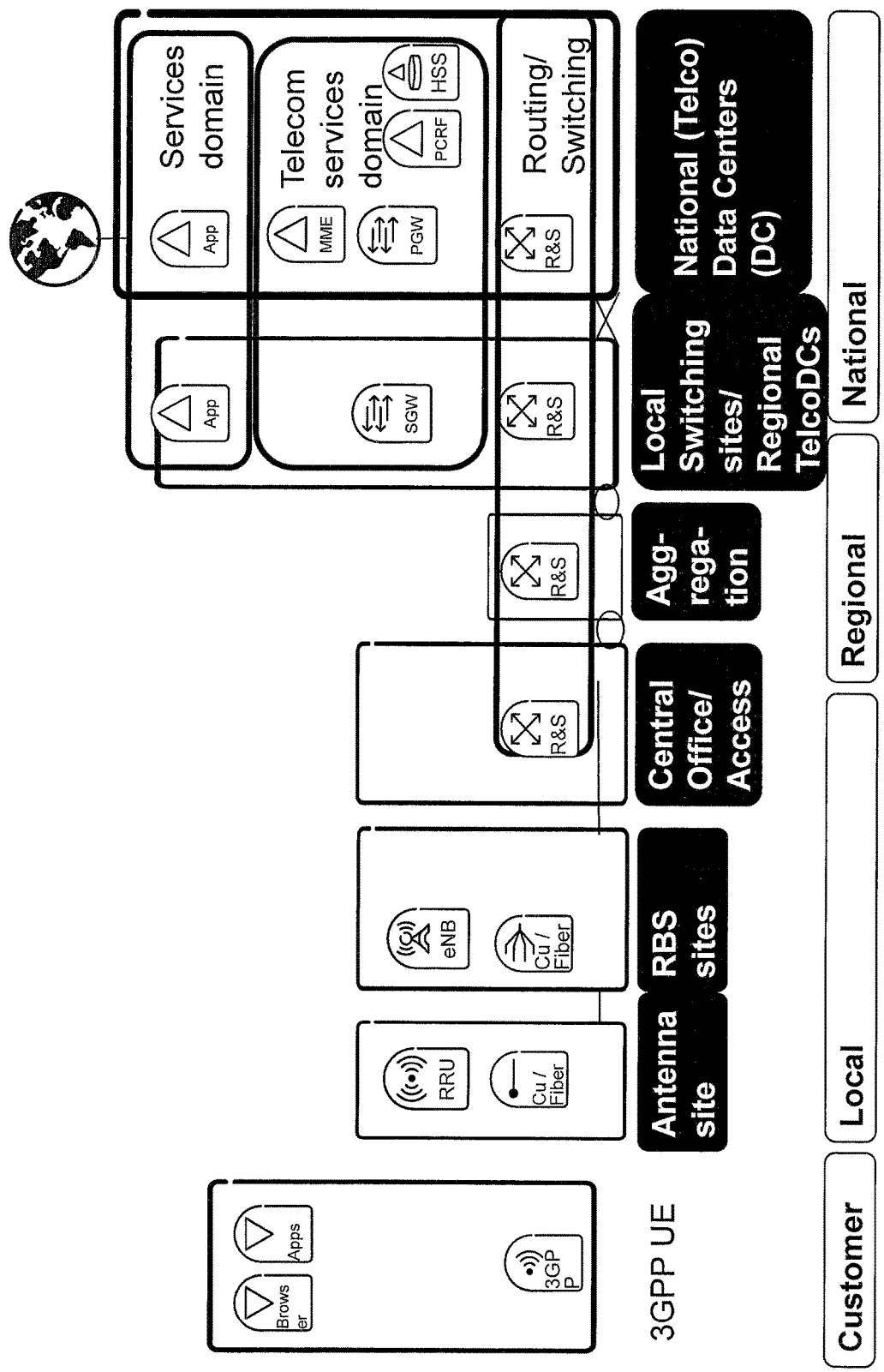
FIG. 1b is a schematic illustration of another deployment view of a communication network.
Figure 2A:
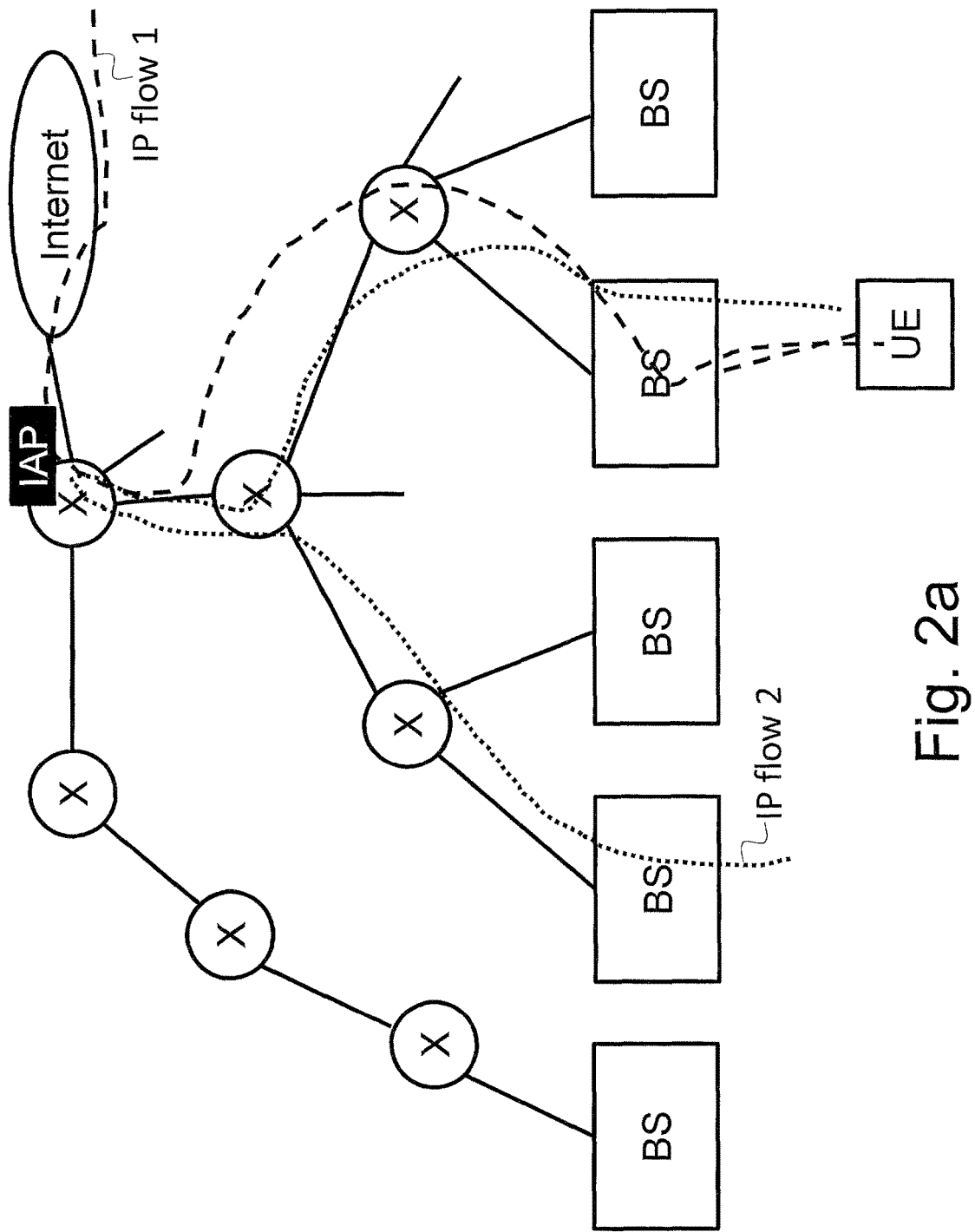
FIGS. 2a-d are schematic illustrations of routing of flows for different IAP placements in different scenarios.
Figure 2B:
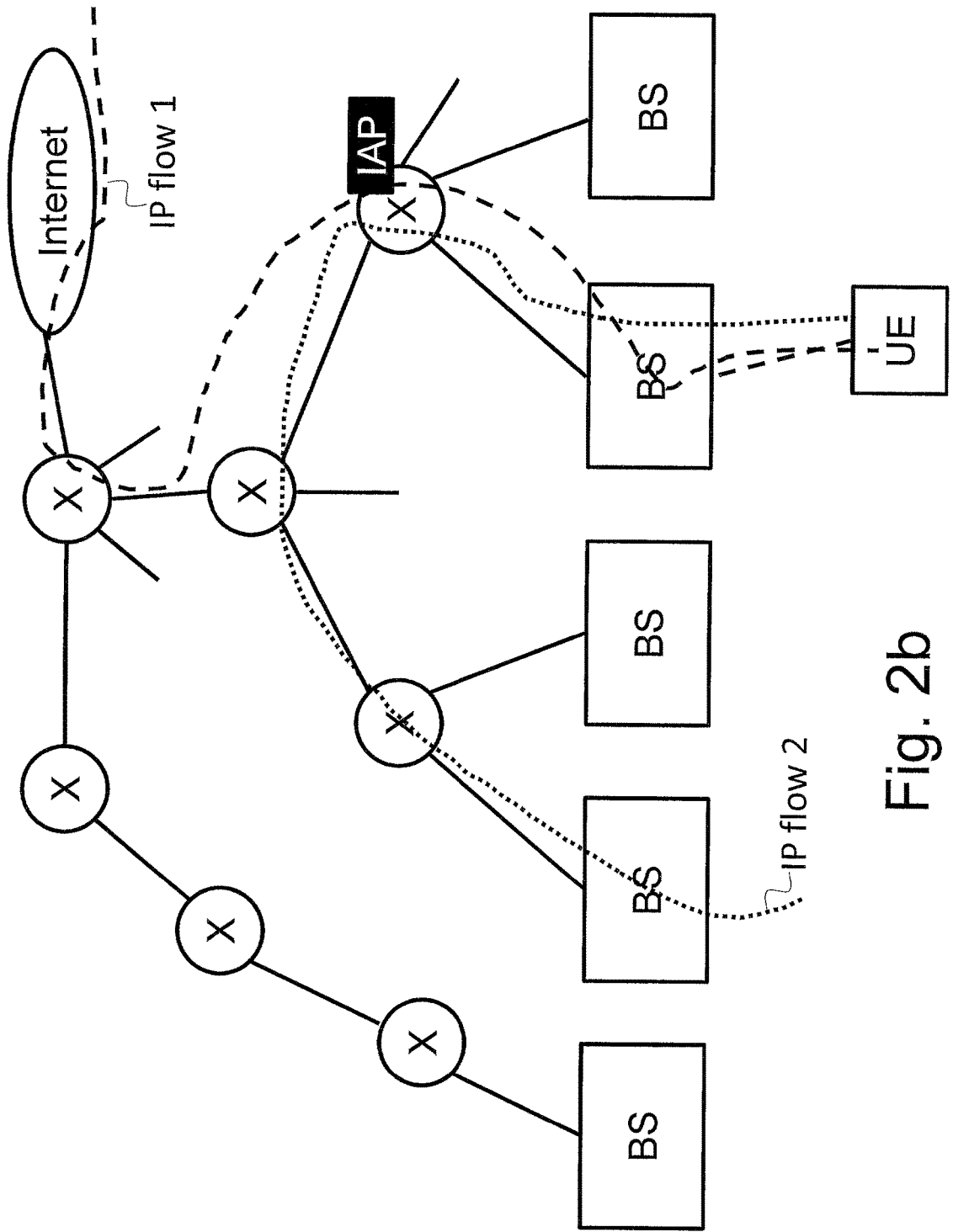
Figure 2C:
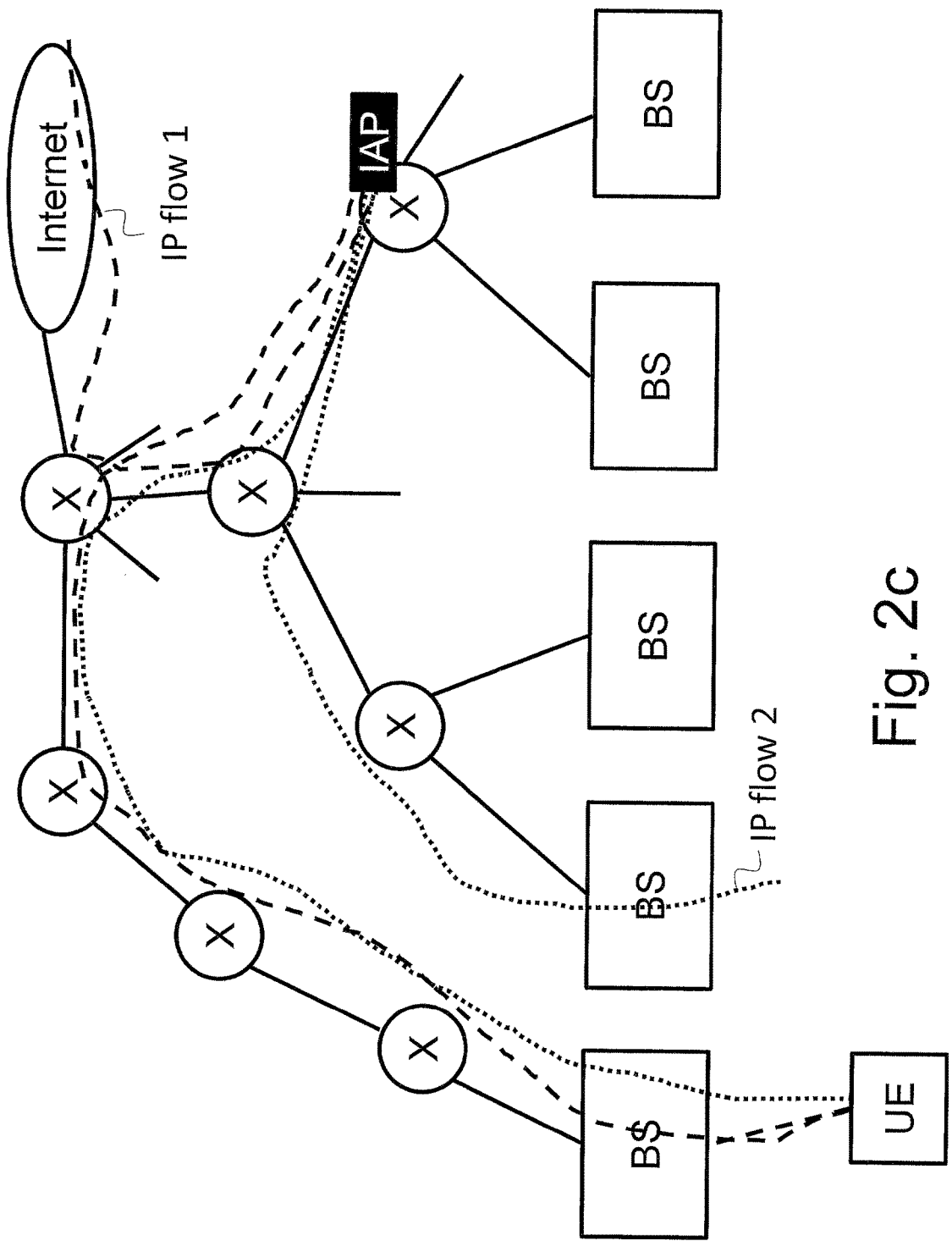
Figure 2D:
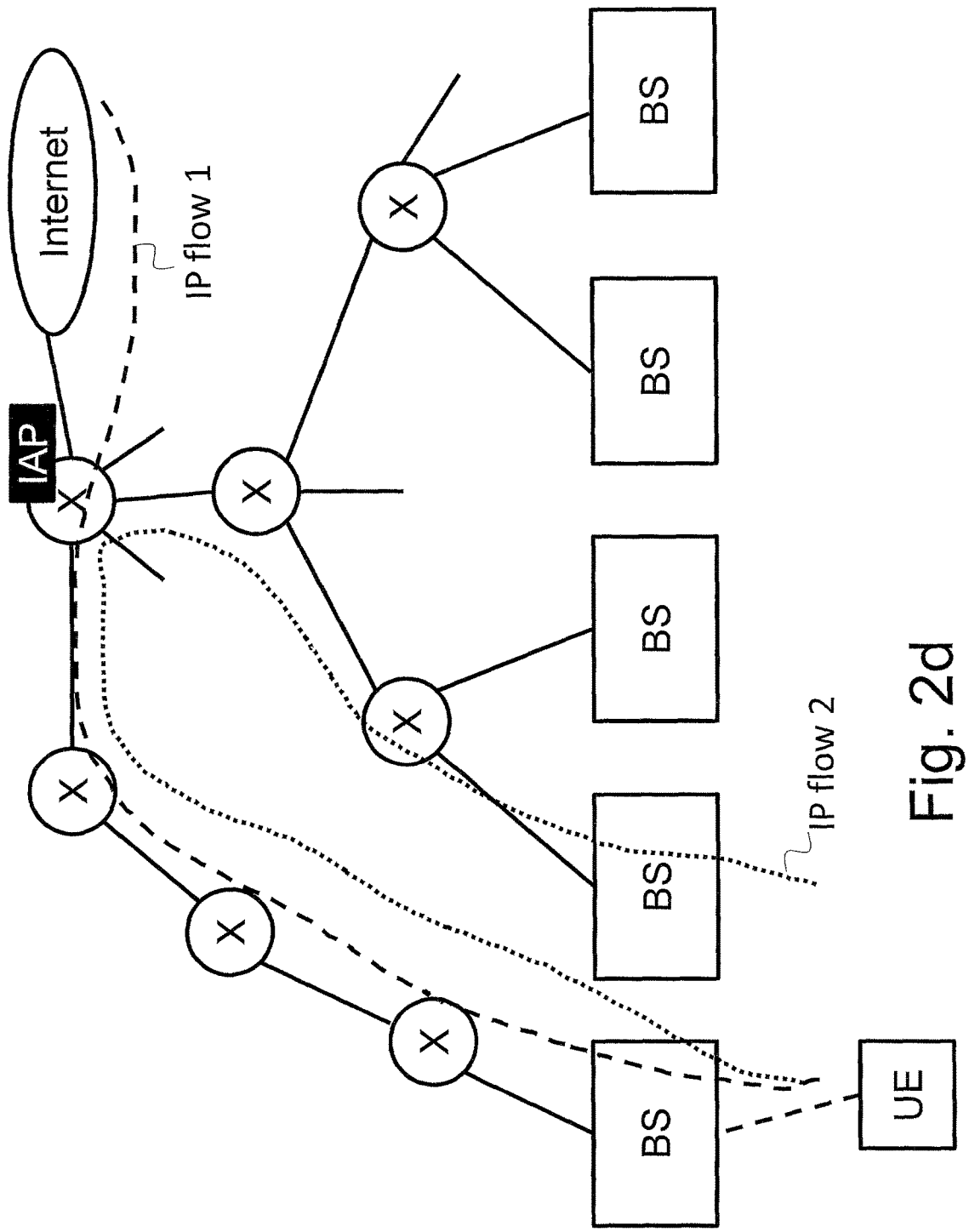
Figure 3:
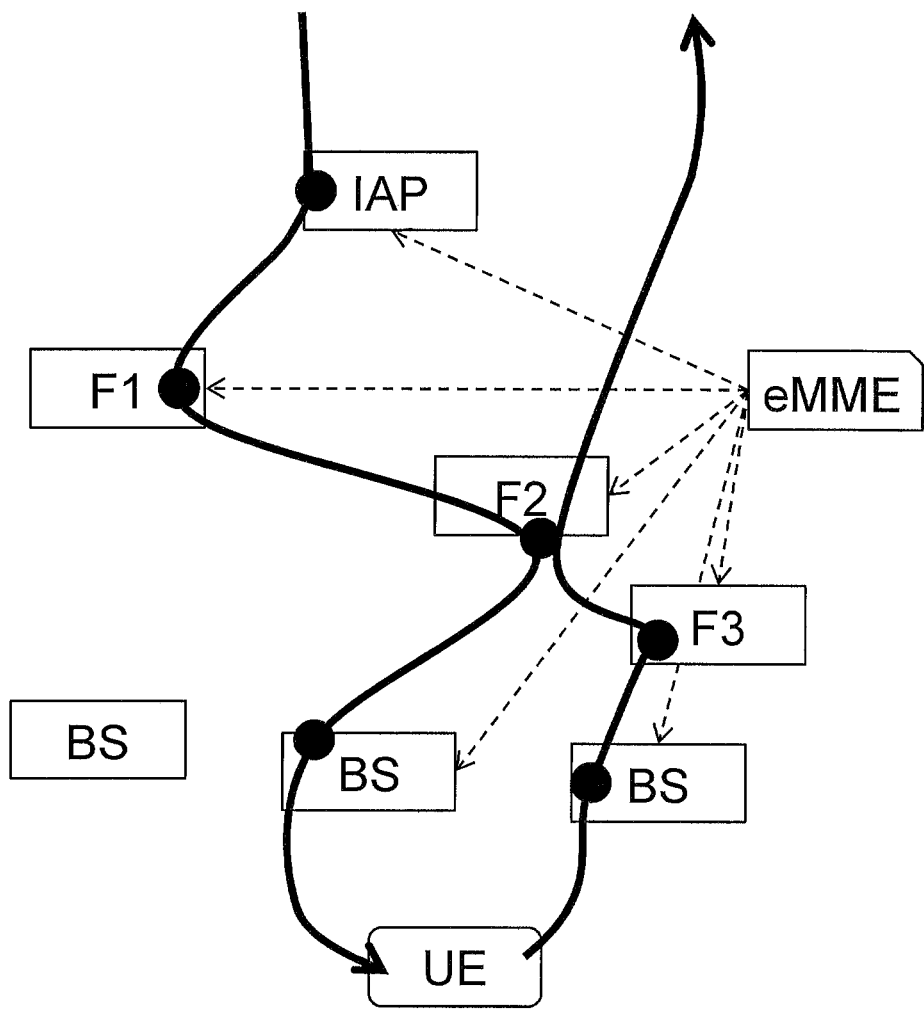
FIG. 3 is a schematic illustration of a high level overall fifth generation (5G) architecture.

Embodiments are described in a non-limiting general context in relation to an example scenario in a high level 5G network architecture in which user plane or data packet processing functionality is relocated. The high level 5G-architecture is schematically illustrated in FIG. 3, visualizing a draft version of one possible 5G architecture. A mobile device, called UE has a radio interface with one or more BSs. The UE may exchange IP packets with a peer (not shown in FIG. 3). The peer may be on the same network, or may be in an external network, such as the Internet. The network operator domain includes, besides BSs, one or more IAPs, one or more evolved MMEs (eMME) handling all control plane related signalling and zero or more functions for processing data packets (F1, F2, F3). It should be noted that embodiments of the invention may be applied to any network architecture, so the 5G network architecture illustrated in FIG. 3 should be seen as an example. Embodiments of the invention may e.g. be applied in both wireless and fixed communication networks and for both wireless and fixed devices.

The problem of sub-optimal routing of flows that may occur for different IAP locations, e.g. when the UE is moving, is addressed by an anchorless architecture where all packet processing functions can be relocated, even the one(s) that would normally constitute an anchor. In embodiments of the invention, a method to do a relocation of one or more functions for processing data packets of a flow associated with a device is provided. This enables the change or relocation of the IAP for the device, in order to achieve an optimal routing of the data packets of a flow associated with a specific end user device.

In FIG. 3 described above, three packet processing functions are shown, F1, F2 and F3. For each data packet that such a function receives, the function performs some kind of processing and forwards the processed packet. Example functions include encryption/description of packets, policy and charging enforcement, deep packet inspection (DPI) and proxy functions. Functions may be chained, which means that a packet passes a function and is then forwarded to a next function of the chain. The chain of functions also comprises switching elements that route the data packets to the correct function. These switching elements may or may not be co-located with the function. In one embodiment, the switching element bases its routing decision on routing rules and information in the header field of the packet. In other embodiments, the switching element may mark the packet in some way e.g. by adding an extra header field. Another switching element, later in the chain, will then use that marking to make its routing decision.

Chains of functions may be valid on various granularities, e.g. for a group of UEs, on a per-UE basis, or on a per-flow basis. The flow is defined by its five-tuple, i.e. source and destination IP addresses in the IP header, protocol field in the IPv4 header or next header field in the IPv6 header, and source and destination port numbers in the transport protocol header. The transport protocol may be Transmission Control Protocol (TCP), User Datagram Protocol (UDP), or Stream Control Transmission Protocol (SCTP). Function chains may be symmetrical or asymmetrical. In the symmetrical chain the same functions are passed in uplink and in downlink. The example in FIG. 3 shows a dual-radio UE with an asymmetrical chain, where functions F3 and F2 are passed in the uplink and functions F1 and F2 are passed in the downlink. In the uplink, the last function in the chain forwards the packet as a plain IP packet. How data packets are forwarded between the functions, e.g. what encapsulation format that is used, does not affect embodiments of the invention and is therefore not described.

In the example scenario, function chains are set up and controlled by the eMME. The setup of a chain could be performed when the UE attaches to the network or when a new flow is started. A function chain for an aggregate of UEs can also be setup before the UEs' attach to the network. The functions may be part of a Software Defined Networking (SDN) environment and the eMME may act as an SDN controller.

The UE's IP address topologically belongs to one or more IAPs. This implies that each IP packet sent from the peer to the UE will pass one such IAP. The function of the IAP is to forward the packet to the first function in the downlink chain.

Initial Attach in the High-Level Architecture

Figure 4:
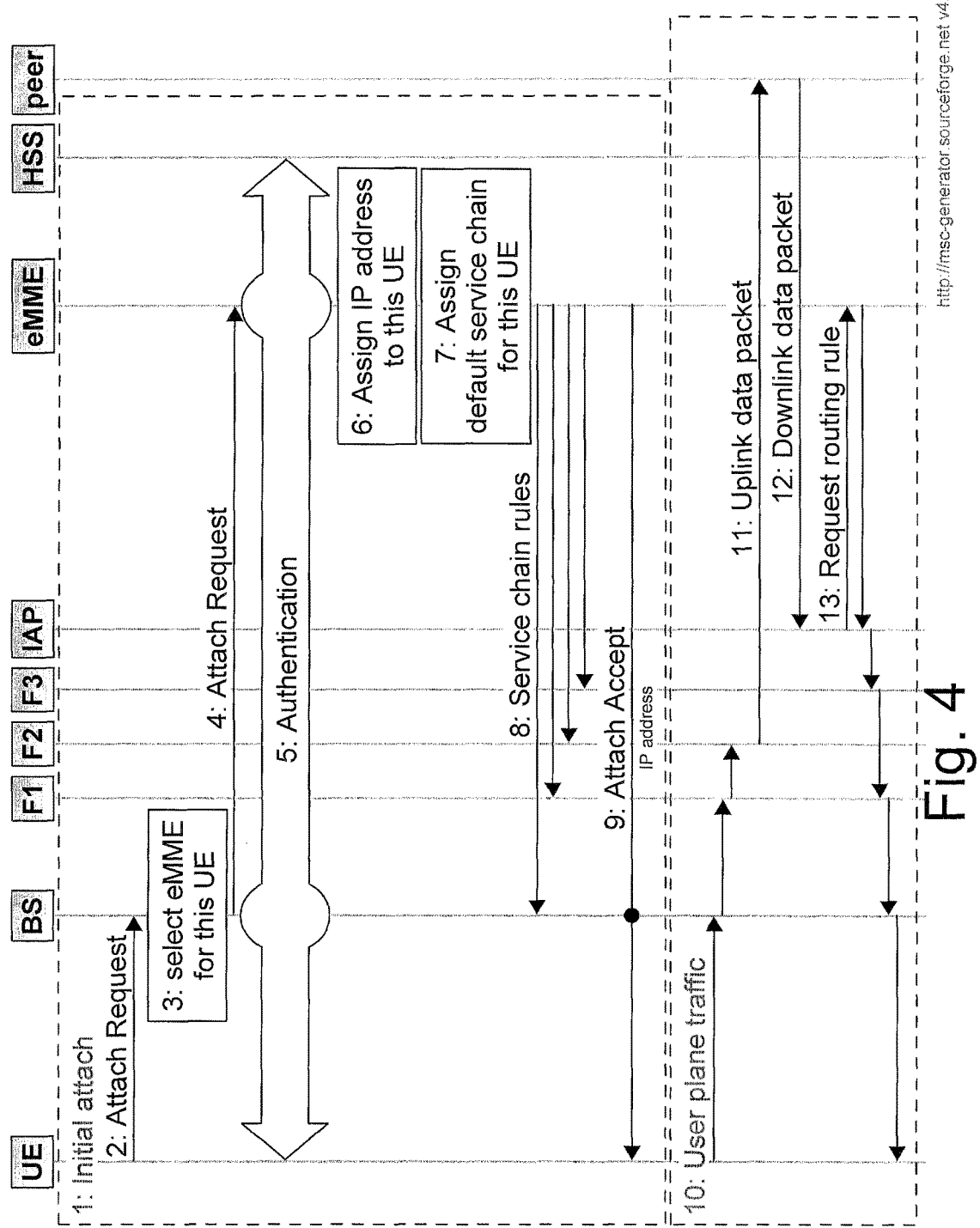
FIG. 4 is a signaling diagram illustrating the initial attach procedure in a network based on the high level 5G architecture.

The signaling diagram or call flow in FIG. 4 illustrates how an initial attach procedure is performed in a communication network based on the high-level architecture. In this example the UE attaches to a single BS. The chain of functions, also referred to as the service chain, for uplink packets comprises F1 and F2, and the service chain for downlink packets comprises F3 and F1. The service chain also comprises switching element that affects the routing of the data packets of the flow in the chain.

The BS receives the attach request message (step 2) and selects an eMME (step 3). The attach request message is then forwarded to the eMME (step 4) and an authentication is performed (step 5). The HSS may contain a user profile. After successful authentication, the eMME assigns an IP address to the UE (step 6) and sets up a default service chain (step 7-8). Every UE has a default service chain that is used for all flows to which no specific service chain is valid. At a later stage, not shown in this call flow, more specific service chains for this UE, e.g. for a single flow, may be added. Once the default service chain has been setup, the eMME sends an attach accept message to the UE (step 9). After that step, the UE may start to send and receive user plane data (steps 10), i.e. uplink data (step 11) and downlink data (step 12). For downlink packets, the IAP queries the eMME (step 13) to find out to which processing function to send the packet. The frequency of these requests can be optimized in several ways. E.g. the IAP can retrieve all routing rules for a particular UE or IP address and cache those.

One embodiment of the architecture shown in FIG. 3 is the existing EPC architecture, in which case the IAP, i.e. the PGW, is the only IAP that advertises the IP address for a certain UE as long as it remains attached to the network, i.e. an anchor-based architecture. Functions like Packet Data Convergence Protocol (PDCP) processing are then performed on the BS, which is called eNB. Functions like policy and charging enforcement are performed on the PGW and the forwarding between eNB and PGW is implemented using GTP tunnels. The service chains would be symmetrical. Additional functions like DPI and TCP proxying are placed "above" the PGW, i.e. after the PGW in the uplink direction.

Seen from a 5G perspective, the current EPC architecture as defined in 3GPP TS 23.401 and TS 23.402 has a number of drawbacks. One drawback is that the architecture lacks the concept of service chaining, and therefore does not provide flexible means to insert new functions in the chain or having multiple chains for a single UE. Another drawback is that all packets for a particular UE or a particular APN for a UE need to pass one and the same PGW. The PGW thus acts as an "anchor point". This may lead to sub-optimal routing.

As part of the 5G project an anchorless architecture is being studied. Another embodiment of the high-level architecture is such anchorless architecture. In that case, multiple IAPs may advertise the UE IP address into the IP routing system, so downlink packets may end up at one of several IAPs. Still each IAP would forward the packet to the first function in the downlink chain. Uplink packets sent from the last function in the chain can be routed directly to the Internet via the physically closest border router, or can be routed directly to an operator's IAP if the peer is connected to such an IAP. Different functions in the chain may be placed at different locations. In one scenario all functions could be co-located on the BS. In this way the most optimal routing would be achieved. In another scenario it may not be feasible to always place all functions on the BS. Some functions may be placed at a more central place in the network; e.g. in a regional or even a national data center site. At the setup time of the service chain, the eMME may find a service chain that provides an optimal route through the network. It should be noted that other traffic flows involving the same UE may pass through a different IAP and different service chains and different function locations may be used for these flows, e.g. in order to achieve optimal routing also for these flows.

Even if functions in an anchorless architecture are initially placed to achieve optimal routing, if the UE moves to another BS and the packet processing functions do not move, the route may become sub-optimal. Current virtualization and networking technologies do not provide a means to relocate a specific packet processing function from one instance to another instance for a service chain specific to a single end user. One object of embodiments of the invention is to support such function relocation. A function defines what to do with a packet. A function instance is executing the function at a specific location in the network deployment.

Generic Relocation Method

Figure 5A:
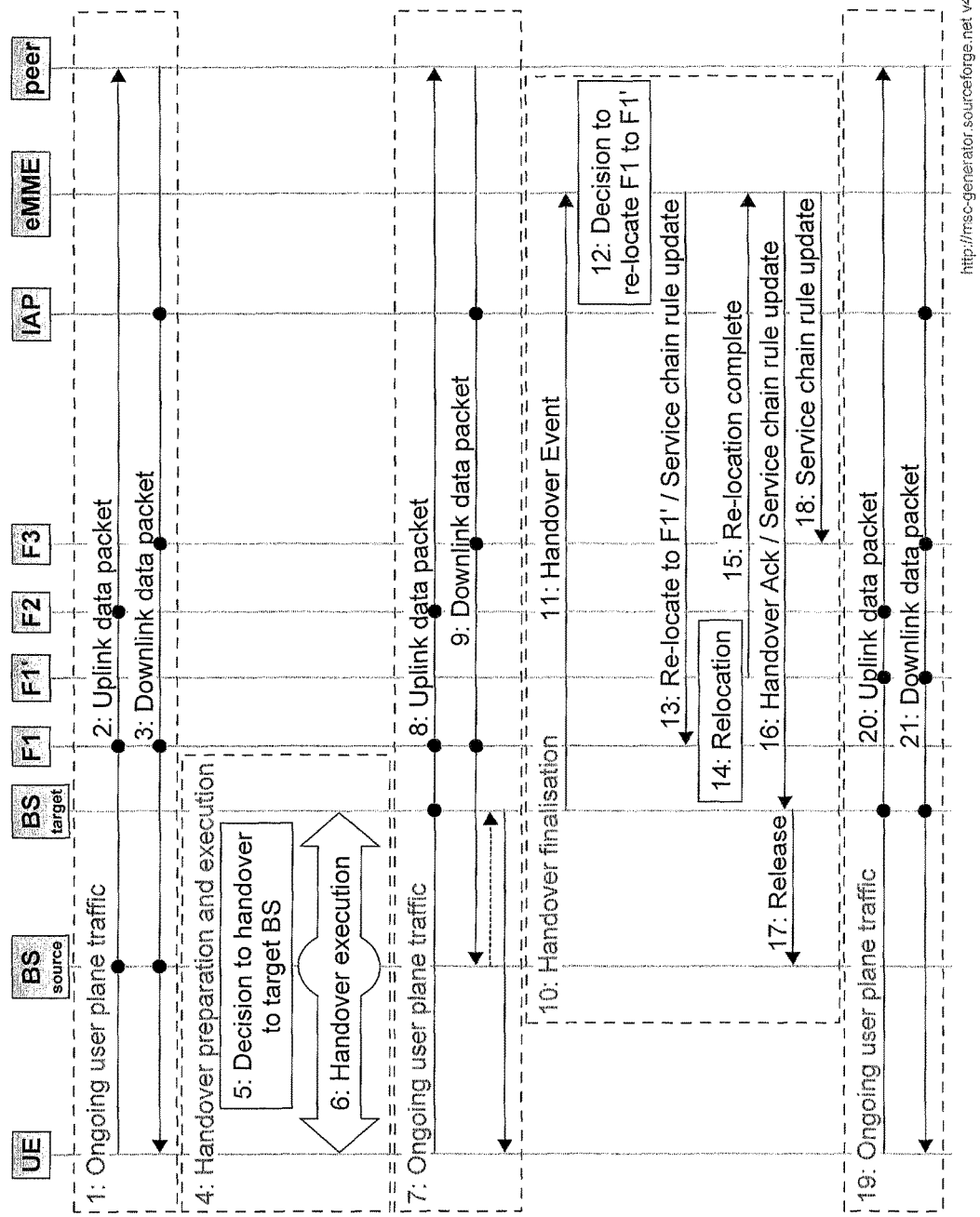
FIGS. 5a-e are signaling diagrams illustrating relocation methods according to some embodiments of the present invention.

The signaling diagram or call flow in FIG. 5*a* illustrates a generic relocation method procedure in the context of an inter-BS radio handover. The relocation method is part of block 10 which describes the handover finalization. The event that is triggering relocation is a handover of the UE from one BS to another. Other triggers are also possible, such as changes related to a load in the network or a maintenance activity in the network. The service chain consists of the same functions as those in the initial attach example. The handover, block 4, corresponds to the "X2-based handover" as defined in 3GPP TS 23.401.

In block 10, function F1 is relocated to a target instance of that same function. This target instance is denoted F1'. One way to relocate multiple functions would be to perform block 10 once for each function.

The eMME decides to relocate F1 to F1' (step 12) and instructs F1 to do a relocation (step 13). In the latter step the eMME also informs F1 about a service chain rule update, i.e., that downlink packets are to be sent to the target BS instead of to the source BS. The service chain rule update thus comprises an update of one or more switching elements in the chain of functions for processing the data packets of the flow. The switching elements are updated with information related to the relocated function. The actual relocation of the function is step 14. Multiple methods are possible here, and these are explained in subsequent sections and with reference to FIGS. 5*b-e*. As part of step 14, F1 informs F1' of the now updated downlink service chain rule.

Once the relocation is done, F1' informs the eMME (step 15). The eMME then updates the proceeding and succeeding functions in the uplink service chain; the target BS is informed to send uplink data to F1' instead of to F1 (step 16), and F3 is informed to send downlink data to F1' instead of to F1 (step 18). The order in which 16 and 18 are performed is irrelevant.

To assist F1' in handling packets in-order, the "end marker" solution used for user plane forwarding at handovers in EPS can be reused here. E.g. in downlink, F3 can send an end marker to F1 right after the chain update (step 18). F1 forwards the end marker to F1'. After that, provided that F1 has no more uplink data to forward to either F3 or F1', F1 can also release its context. Alternatively, F1' can request F1 to release its context when F1' has received the end marker, either immediately upon receiving the end marker or a certain time after the reception of the end marker.

Step 16 may also serve as an acknowledgement to step 11. Such acknowledgement could then also trigger an explicit release message to the source BS (step 17). Alternatively, the release of the source BS is done implicitly by letting F1 send an end marker to the source BS.

Specific Methods to Relocate a Function

Hereinafter, example embodiments of relocation methods are described with reference to FIGS. 5b-e. They thus describe how step 14 in the call flow in FIG. 5a can be performed. There may be more examples of such relocation methods. Furthermore, the methods may be combined. As one example one relocation method may be used for one subset of the flows in the chain, and another relocation method may be used for another subset of the flows in the chain. The eMME may instruct the function to use a specific relocation method. Alternatively, the function itself may decide which relocation method to use. The decision may e.g. be based on the capabilities of the function, the deployment of the function in the network, and the nature of the user plane packets.

Figure 5B:
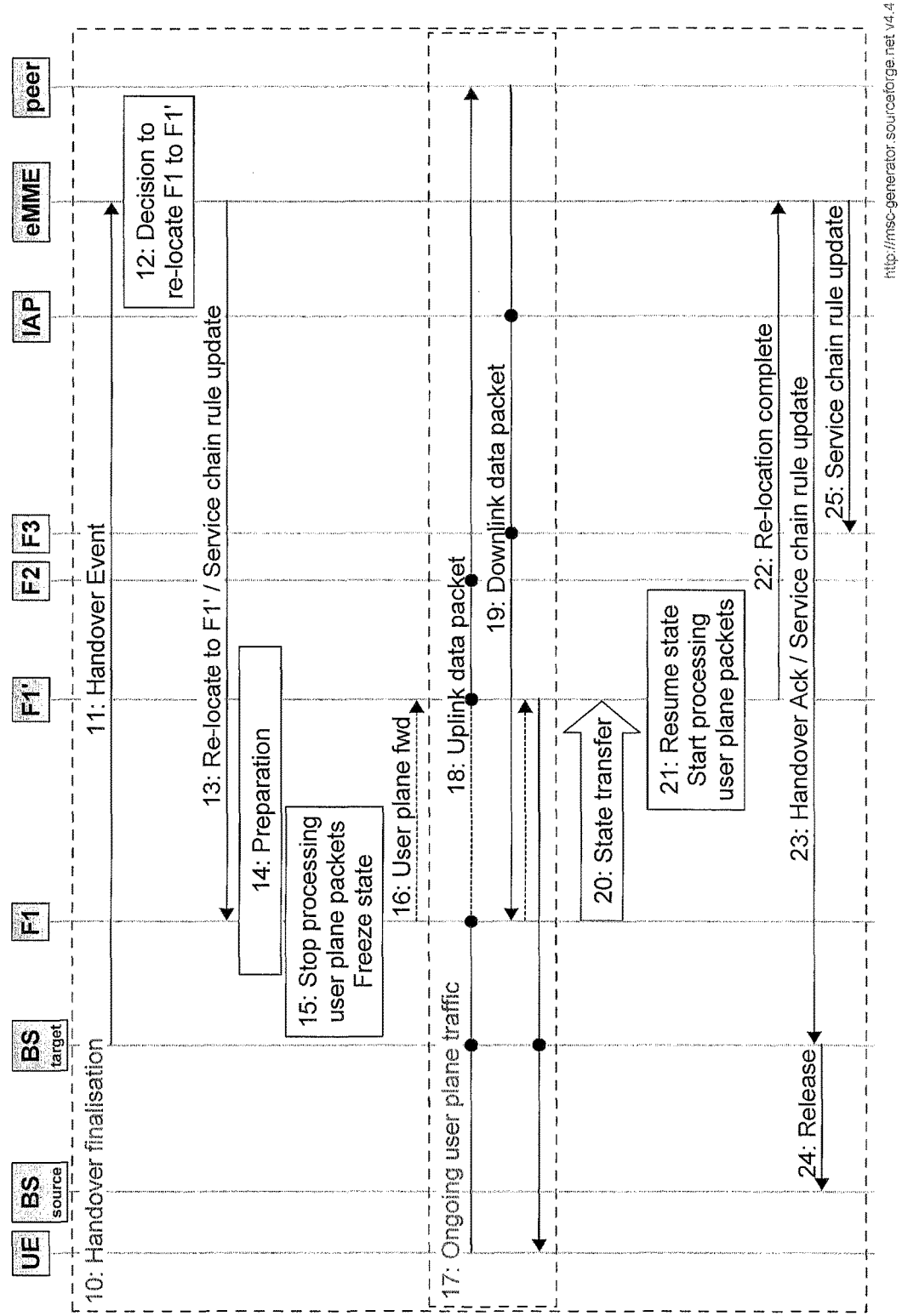

Freeze-Move-Resume Relocation Method (FIG. 5b)

The signaling diagram or call flow in FIG. 5b specifies block 10 of the generic call flow in FIG. 5a in more detail. The rest of the generic call flow remains the same.

In this relocation method, the state related to the user plane packet processing of the source instance of the function is frozen (step 15). Then all state is copied to the target instance of the function (step 20). Finally, packet processing is resumed in the target instance based on the copied state (step 21).

State involves all parameters related to the processing of the packets for this UE's service chain. Examples of such parameters include: buffered packets, counters, sequence numbers, acknowledgements, user subscription information, security keys, and timers.

Freezing state means that the function stops processing packets such that the state is no longer updated. Packets that are sent to the function while the state is frozen can be forwarded to the target instance of the function (step 16).

Before freezing the state, the source instance could run a preparation phase (step 14). It could e.g. assess how much state is to be transferred, and perform bandwidth allocation on the source-target link for the transfer. It could also select the best protocol to use for the state transfer (step 20). Different protocols may suit better in different situations. If TCP is to be used, the source could run the slow-start with bogus data or query the nodes on the source-target link and negotiate a higher initial window size. A further option is not to reserve anything, but to send the state transfer with some higher priority class, such as network control. This would be at the expense of regular network traffic. Either way, the source could calculate how long the relocation would take, and inform the eMME about this. This optional informing of the eMME could be done with a message from F1 to the eMME after step 14 (not shown in FIG. 5b). The eMME then takes the final go/no-go decision. This could be done by an explicit signaling to the eMME for every relocation, or by pre-provisioned rules previously received from the eMME.

The freeze-move-resume method is in particular beneficial if the state is fairly small and if the required bandwidth to transfer the state is small compared to bandwidth available to regular traffic, and if the relocation time can be kept short.

Figure 5C:
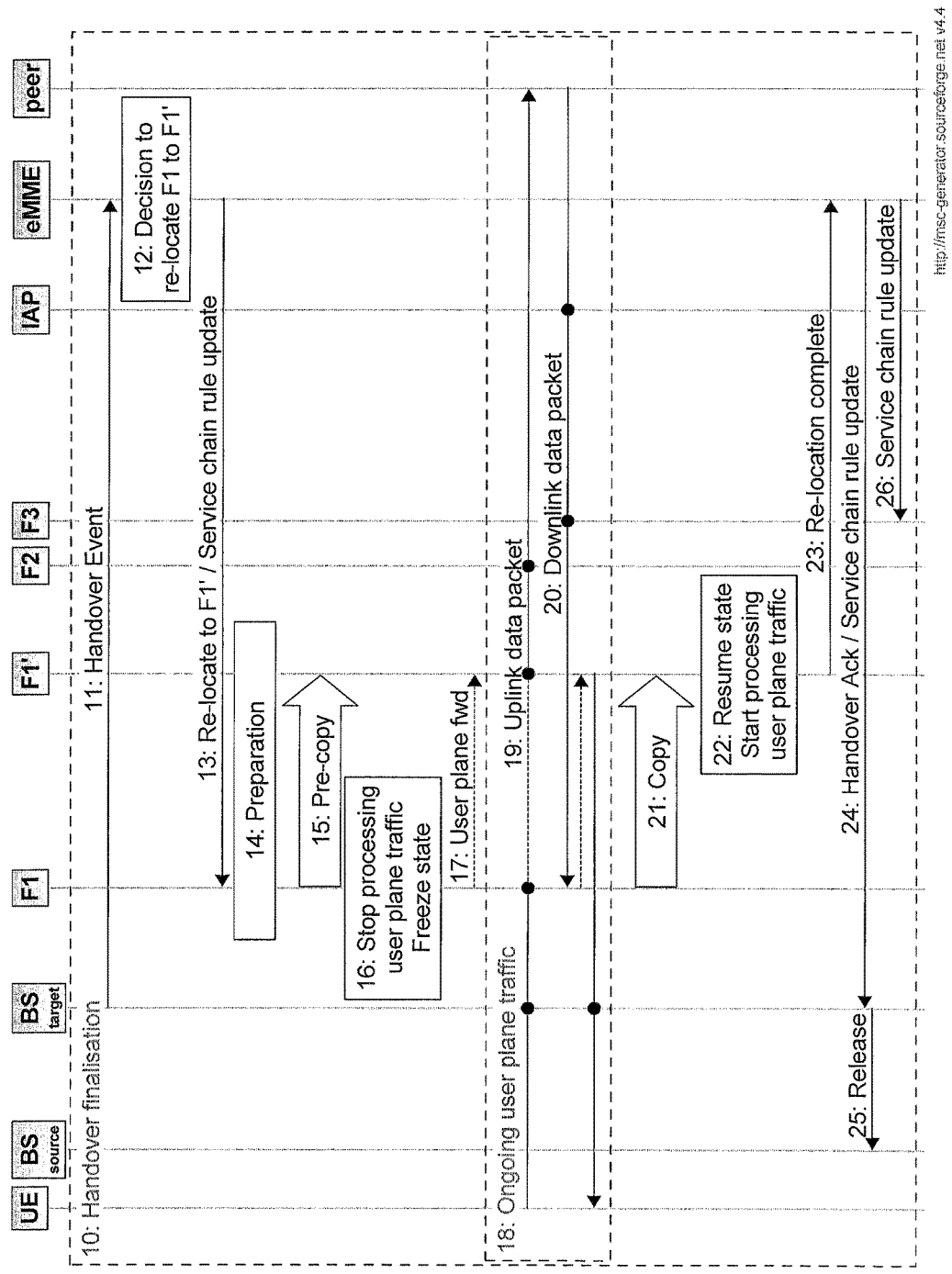

Pre-Copy Relocation Method (FIG. 5c)

The signaling diagram or call flow in FIG. 5c specifies block 10 of the generic call flow in FIG. 5a in more detail. The rest of the generic call flow remains the same.

The pre-copy method is an attempt to decrease the time that user plane packets cannot be processed. In particular, it tries to decrease the time between "freeze state" and "resume state" in the freeze-move-resume approach. The idea is that while the source instance is processing packets, it continuously updates information elements in its user state. The frequency of these updates will differ per information element and will also depend on the traffic intensity and the type of traffic. A subset of the information elements, e.g. those that are not updated frequently, could be pre-copied to the target while the source continues to process packets (step 15). Once the source stops processing packets (step 16), only the updated and not-yet-copied information elements need to be transferred (step 21). The other steps are equal to the freeze-move-resume method.

A trivial approach to implement this method would be to pre-copy the entire state, then freeze, then copy the information elements that have been updated since the pre-copy. Another approach would be to base the implementation on a "distributed database", where distribution means that copies of the same information element are kept in the source and target instance. Yet another approach would be to have a classifying period before the pre-copying. The classification would result in an "update rate" on each information element. The more frequent updates, the higher the rate. Once the classification is performed, the pre-copying is only done on those elements that have an update rate below a certain threshold. Given the threshold and the available bandwidth for the transfer, the time where no user plane processing is possible can be estimated. The threshold value or the time when no processing is possible can be negotiated with the eMME.

The pre-copy method is in particular beneficial if there is a lot of state to transfer and if large parts of the state are more or less stable.

Figure 5D:
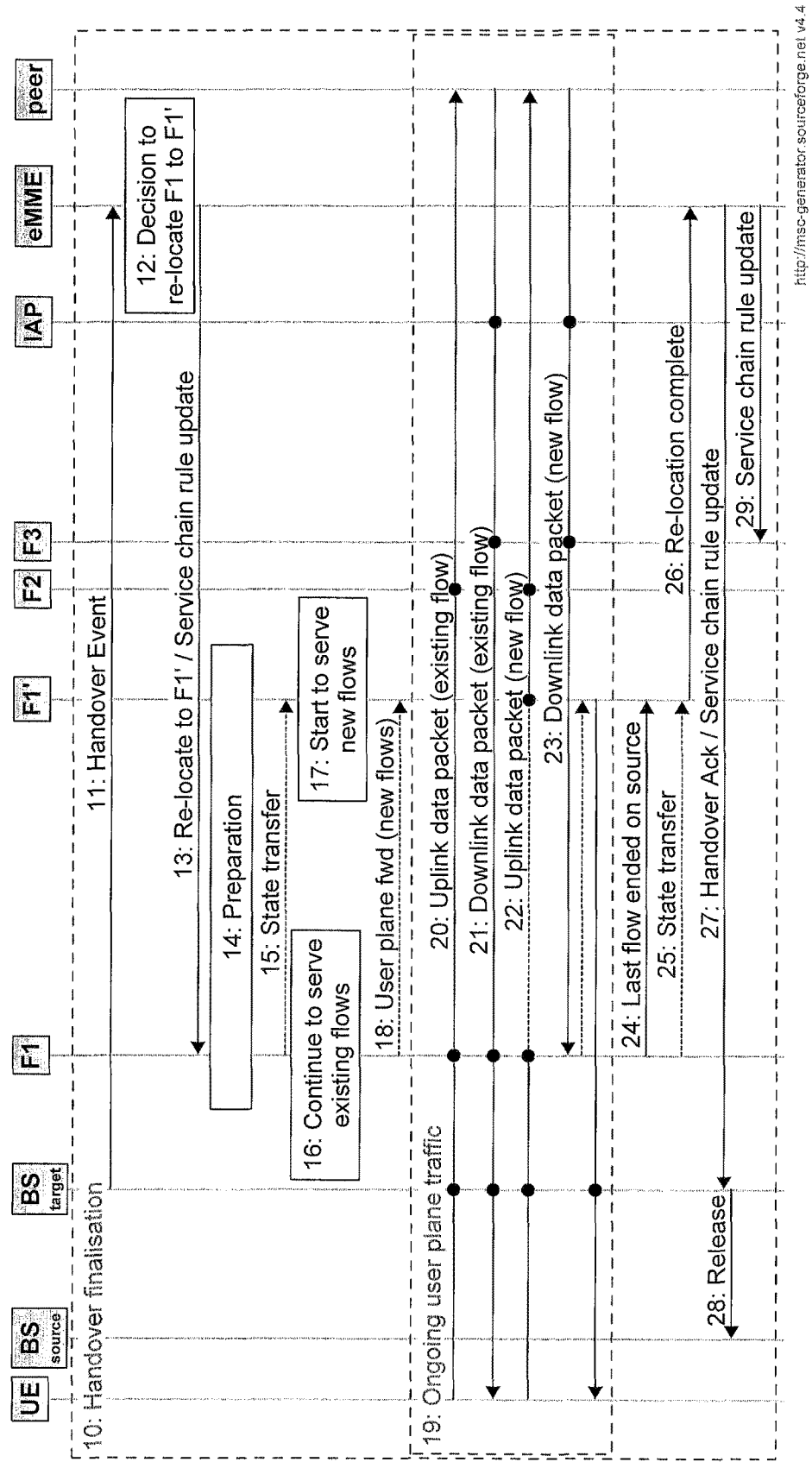

Only-New-Flows-On-Target Relocation Method (FIG. 5d)

The signaling diagram or call flow in FIG. 5d specifies block 10 of the generic call flow in FIG. 5a in more detail. The rest of the generic call flow remains the same.

This method is an attempt to completely eliminate the time that user plane packets cannot be processed. In particular, there is no "freeze state". The idea is that existing flows, i.e. flows that are active when the function receives the relocation command from the eMME (step 13), are processed on the source instance of the function until the flow ends. Only new flows, i.e. flows that start after the relocation command from the eMME, are processed on the target instance. In this approach, the function needs to know when a flow ends. For TCP (and SCTP) this is possible by examining the packets. For UDP a time-out mechanism could be used. If no packets for this flow have passed the function during a specific time, the context is removed, which is a similar approach as in e.g. a NAT.

F1 continues to forward uplink processed packets of existing flows to F2 (step 16 and 20). F1 forwards uplink packets of new flows to F1', where F1' does the processing (step 17 and 18). In the downlink, F3 continues to send all packets to F1, where F1 forwards downlink packets for new flows to F1'. This forwarding continues until the last existing flow has ended on the source. Only then the eMME is informed (step 24) and can start to send service chain rule updates.

The optional steps 15 and 25 are not context transfer of user plane packets, but transfer of e.g. policy rules, charging counters, etc. Some of this state needs to be sent to the target function before it starts processing, e.g. policy rules (step 15), and some of this state can only be sent after the source has finished processing (e.g. charging counters, step 25). Step 24 and 25 may be combined.

The only-new-flows-on-target method is in particular beneficial if the lifetime of the existing flows is short.

A potential problem with this method is long-lasting flows. If a flow never ends, the source will never get released. One approach to solve this would be to combine this method with one of the previous methods. E.g., if there still are existing flows on the source after a particular time, a freeze-move-resume is initiated. A more complicated approach would be to let the target inform the eMME of newly started flows. Or, alternatively, let the source inform the eMME of existing flows (just before step 16 starts). The eMME could then inform the predecessor and successor functions in the chain to route new flows already to the target function, releasing the source function of forwarding packets from those flows. This approach, i.e. different service chains for different flows to the same UE, requires per-flow service chaining, which increases state in both eMME and in the predecessor and successor functions. It also increases signaling to the eMME. Yet another alternative would be that neither the source, F1, nor the target, F1', informs the eMME of old or new flows, The eMME would then provide updated service chain rules to the predecessor and successor instructing them to route only new flows in accordance with the updated service chain rules. The restriction to new flows could be implicitly understood—in principle the eMME does not even have to be aware of it—or explicitly indicated in the service chain rule update. With this alternative neither the state nor the signaling increases for the eMME.

Another aspect of long-lasting flows is that the target may, in its turn, get relocated before the last flow has ended on the source. One way to handle this is to avoid it; the eMME simply waits for the "re-location complete" message from the source until a new relocation is initiated by the eMME. Alternatively, the eMME allows this to happen. Intermediately informing the eMME of newly started flows, as described above, can be used to limit forwarding.

Figure 5E:
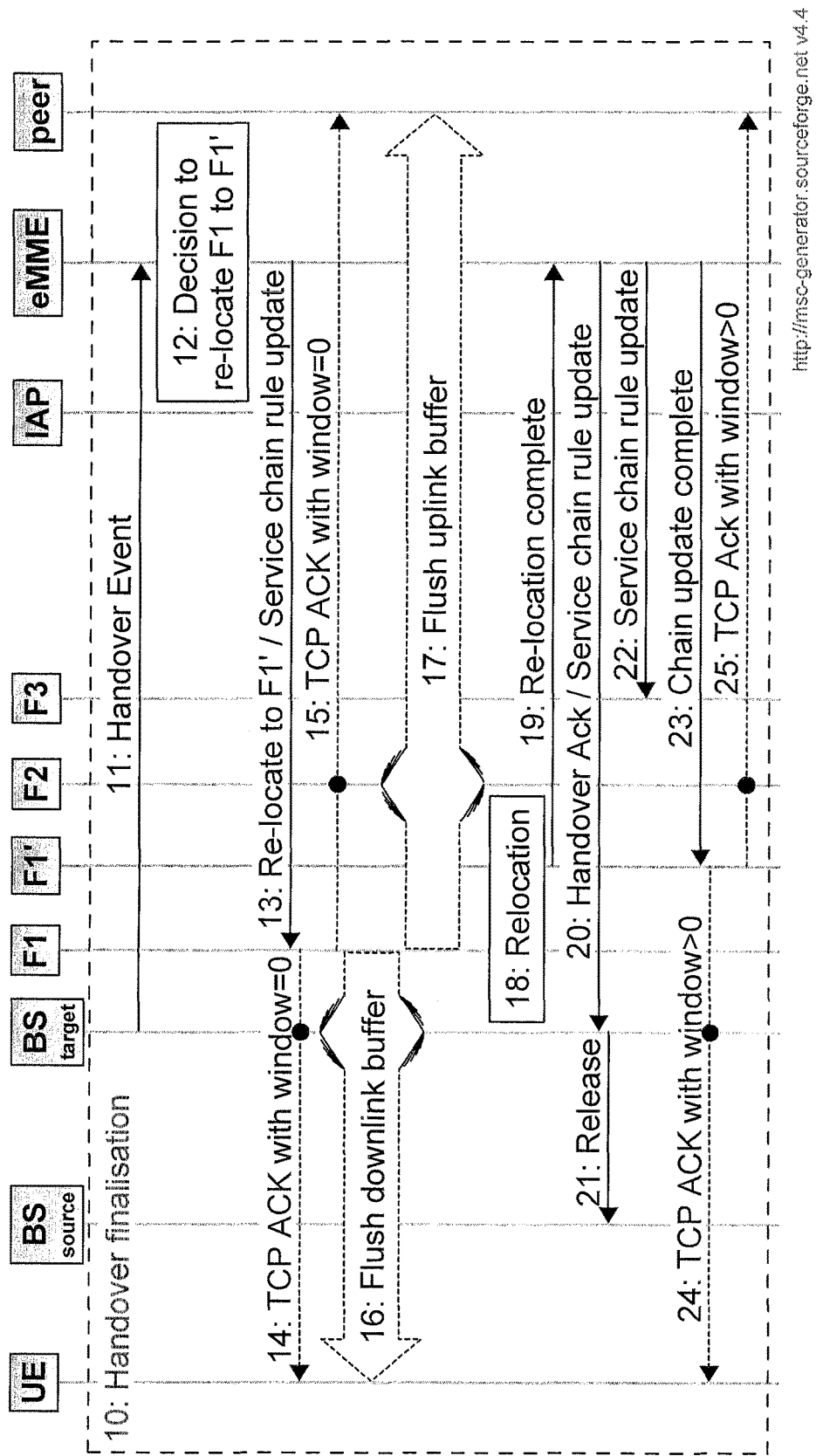

Flushing Relocation Method (FIG. 5*e*)

The signaling diagram or call flow in FIG. 5*e* specifies block 10 of the generic call flow in FIG. 5*a* in more detail. The rest of the generic call flow remains the same.

This method is an attempt to limit the number of buffered user plane packets that are copied to the target function as part of the state transfer. This method is in particular beneficial for functions that act as proxy, e.g. a TCP or MPTCP proxy. These functions may have large user plane packet buffers.

The idea is that for those packets the TCP or MultiPath TCP proxy receives from the UE (uplink) and the UE's peer (downlink), it sends a TCP ACK with receiver window size 0 (steps 14/15). Receiving the first ACK with window size 0 makes the UE and the peer stop sending packets, as the allowed number of outstanding bytes is the minimum of the congestion window and the receiver window, hence 0. However, there may be other packets arriving after sending the first ACK with window size 0, as the peer may have sent additional data packets, the window allowing. Reception of these packets are also acknowledged with TCP ACK with window size 0 by the TCP or MultiPath TCPproxy. Finally, the TCP or MultiPath TCP proxy will not receive any new data packets after approximately one RTT after sending the first ACK with window size 0.

The (MP)TCP proxy continues to send already buffered data to the UE (downlink, step 16) and to the peer (uplink, step 17). During this process, some data packets may arrive from the senders, as described above. There are multiple ways to handle this situation, In the first option, the TCP or MultiPath TCP proxy repeats step 14 and step 15, accordingly, and will flush those packets subsequently in steps 16 and 17. Also, when sending the first TCP ACK with window size 0 the proxy starts a timer that is set to RTT or slightly larger. Before this timer expires, the relocation cannot happen (step 18), as new data packets may still arrive that needs to be flushed. In another option, the data packets arriving after the first TCP ACK with window size 0 will be part of the user plane context and will be relocated in step 18. They may or may not be acknowledged by the old TCP or MultiPath TCP proxy. As a third option, they will be forwarded on the user plane, but not via the relocation method, to the new function and buffered there. As a fourth option, they are discarded and not acknowledged by the TCP or MultiPath TCP proxy and will be re-sent by the endpoints according to the TCP algorithm at a later point after the receiver window opened again.

Eventually, all buffered packets that can be sent have been sent and the UE and the peer have acknowledged these packets. At this point in time, the relocation to the target instance is made (step 18). This step is performed using one of the previously mentioned methods, e.g. step 18 in FIG. 5*e* may consist of steps 14-21 in FIG. 5*b*. After the relocation, the target instance of the proxy starts acknowledging packets to the UE and the peer with a window size >0 (steps 24 and 25), enabling the UE to send uplink packets and the peer downlink packets. Note that steps 14 and 15 may run in parallel, steps 16 and 17 may run in parallel, and steps 24 and 25 may run in parallel. To avoid that new packets arrive at the source instance, steps 24/25 should not be sent until the service chain has been updated (steps 20-23). The only way for the target to know when these steps have been performed, is by getting a notification from the eMME (step 23). In this method, the target can request the eMME to send this notification by setting a flag in the message of step 19. In the previously mentioned methods such flag would not be set, or not even included in the message, and then step 23 would not be performed. An alternative way, avoiding step 23, would be to perform steps 24/25 immediately after step 18 and accept that packets are forwarded from F1 to F1' until the service chain has been updated.

There may be variants to the above described procedure. The purpose, however, is that the source function empties, or "flushes", its data packet buffers before the relocation is performed. Note that in some cases it may not be possible to fully empty the buffer. E.g. in MPTCP there may be multiple subflows, and packets for one subflow are buffered because there is a dependency towards a packet on another subflow that has not yet arrived at the proxy.

Methods According to Embodiments

Figure 6A:
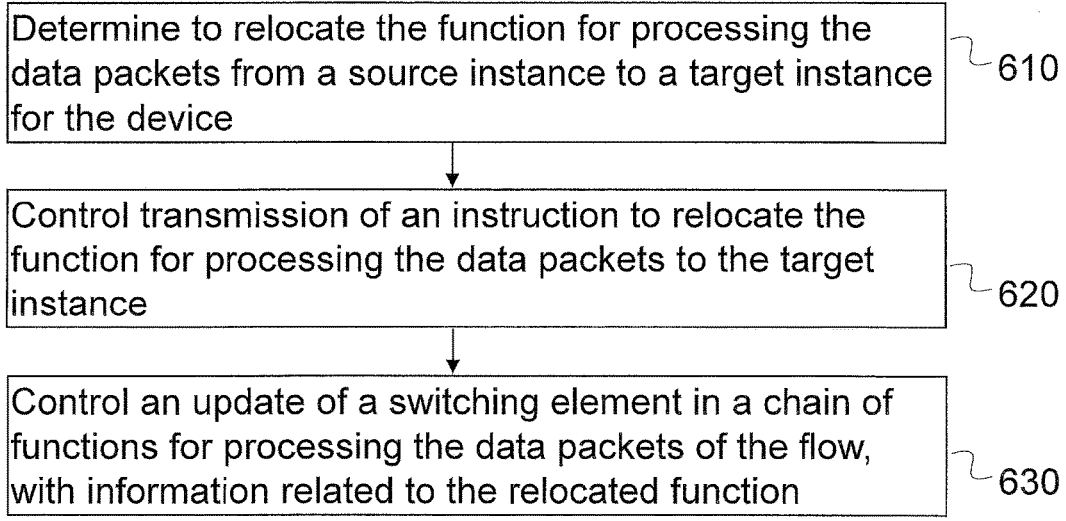
FIGS. 6a-b are flowcharts illustrating the method in the arrangement controlling the function for processing data packets of a flow according to some embodiments of the present invention.

FIG. 6*a* is a flowchart illustrating one embodiment of a method for an arrangement 800 of a communication network. The arrangement controls a function for processing data packets of a flow associated with a device 810. The arrangement may in one embodiment correspond to the eMME described previously. The method comprises:

610: Determining to relocate the function for processing the data packets from a source instance 850 to a target instance 860 for the device. This may correspond to step 12: Decision to relocate in the embodiments of FIGS. 5*a-e*. The relocation may be done on a per-device basis, so it is determined to relocate the function for the device associated with the flow. In one embodiment, the communication network is a wireless communication network, and the device is a wireless device. The determining 610 to relocate the function may in the wireless communication network embodiment be triggered by a handover decision for the wireless device. This trigger corresponds to step 11: Handover Event in FIGS. 5*a-e*. However, other triggers are possible which may also be applicable for communication networks and devices that are not wireless, such as changes related to a load in the network.

620: Controlling transmission of an instruction to relocate the function for processing the data packets to the target instance, the instruction being transmitted to the source instance. This may correspond to step 13: Relocate to F1' in the embodiments of FIGS. 5*a-e*. The instruction to relocate may be transmitted to the source instance either directly or via the target instance. When the instruction is sent via the target instance, the target instance may forward the instruction to the source instance. Furthermore, the instruction may be transmitted by another node in the communication network although it still is the arrangement that controls the transmission. The instruction to relocate may comprise at least one of the following: information related to routing of the data packets of the flow performed by switching elements of the chain of functions; an address of the target instance; and information identifying the flow affected by the relocation. The address of the target instance comprised in the instruction to relocate may be used by the source instance for forwarding information related to the relocation to the target instance, as further described below with reference to FIG. 7*b* for the method performed by the source instance.

630: Controlling an update of a switching element in a chain of functions for processing the data packets of the flow comprising said function subject to relocation. The switching element affects the routing of the data packets of the flow in the chain. The switching element is updated with information related to the relocated function. This update is performed to inform preceding and/or succeeding switching elements about the relocation. The preceding and succeeding switching elements must not be the immediately preceding and succeeding switching elements but can be further away in the chain. As explained previously, the switching element may base its routing decision on routing rules and information in the header field of the packet, or it may mark the packet in some way e.g. by adding an extra header field so that another switching element, later in the chain, may use the mark to make its routing decision. This may correspond to step 13: Service chain rule update in the embodiments of FIGS. 5*a-e*. The switching element may be updated with information indicating a new destination for the routing of the data packets of the flow; or information indicating a new pre-defined routing path for the data packets of the flow.

Figure 6B:
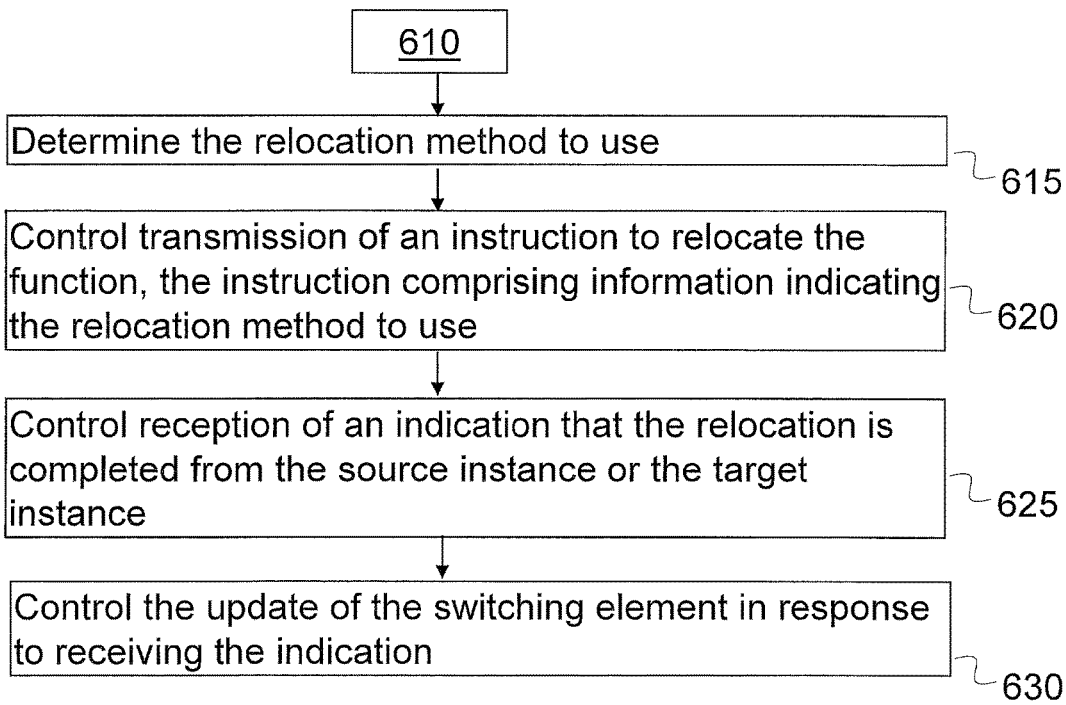

FIG. 6*b* is a flowchart illustrating another embodiment of the method in the arrangement 800. The method may comprise:

610: Determining to relocate the function for processing the data packets from a source instance 850 to a target instance 860 for the device. See description above for more details about the determining in 610.

615: Determining the relocation method to use, based on at least one of a capability of the function, a deployment of the function in the communication network, and a characteristic of the data packets of the flow. Other parameters to base the relocation method choice on may be:

A property of the function, such as the size of the context to be transferred between the source and target instances, e.g. in terms of the amount of state information data to be transferred.

A property of the transport network links to be used for the transfer of context for the relocation, such as a traffic load or an expected data rate of the transport network links, or an expected time required for the transfer.

620: Controlling transmission of an instruction to relocate the function for processing the data packets to the target instance, the instruction being transmitted to the source instance. The instruction to relocate may comprise information indicating the determined relocation method to use. The instruction to relocate may also comprise information related to routing of the data packets of the flow performed by switching elements of the chain of functions; an address of the target instance; and/or information identifying the flow affected by the relocation. See description above for more details about the transmission of the instruction.

625: Controlling reception of an indication that the relocation is completed from the source instance or the target instance. This may correspond to step 15: Relocation complete in the embodiment of FIG. 5*a*. In embodiments, the method may alternatively or additionally comprise controlling reception of an acknowledgement of the instruction from the source instance, and controlling 630 the update may be performed in response to receiving the acknowledgement.

630: In response to receiving the indication that the relocation is completed, the method may comprise controlling an update of a switching element in a chain of functions for processing the data packets of the flow comprising said function subject to the relocation. The switching element affects the routing of the data packets of the flow in the chain. The switching element is updated with information related to the relocated function. See description above for more details.

In any of the above embodiments described with reference to FIG. 6*a-b*, the chain of functions for processing data packets may be part of an SDN environment in which the arrangement acts as the SDN controller.

Figure 7A:
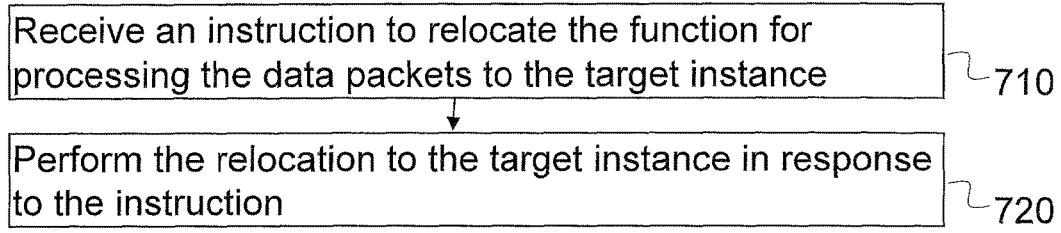
FIGS. 7a-c are flowcharts illustrating the method in the source instance of the function for processing data packets of a flow according to some embodiments of the present invention.

FIG. 7*a* is a flowchart illustrating one embodiment of a method for relocating a function for processing data packets of a flow associated with a device 810 from a source instance 850 to a target instance 860 of a communication network. The source instance 850 may in the embodiments illustrated in FIGS. 5*a-e* correspond to the instance of the function F1, while the target instance 860 corresponds to F1'. The function for processing the data packets of the flow is controlled by an arrangement 800 of the communication network. The communication network may be a wireless communication network and the device may be a wireless device. The method is performed in the source instance 850 and comprises:

710: Receiving an instruction to relocate the function for processing the data packets to the target instance. The instruction is received from the arrangement controlling the function. This corresponds to the method step 620 performed by the arrangement described above with reference to FIG. 6*a-b*. The instruction to relocate may be received either directly from the arrangement or via the target instance.

720: Performing the relocation to the target instance in response to the instruction. Performing the relocation to the target instance may comprise transmitting context information related to the processing of the data packets to the target instance, as described previously in the section Specific methods to relocate a function. This may correspond to step 14: Relocation in the embodiment of FIG. 5*a*.

Figure 7B:
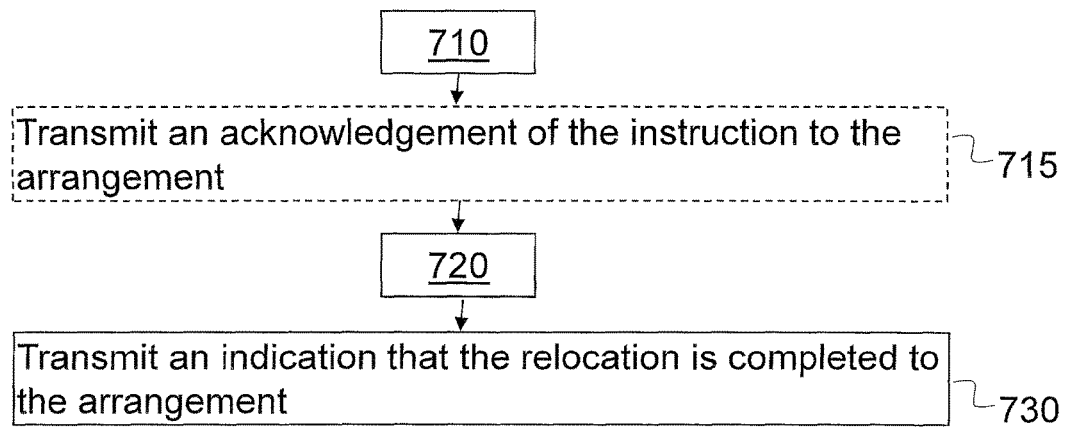

FIG. 7*b* is a flowchart illustrating another embodiment of the method in the source instance 850. The method may comprise the following:

- 710: Receiving an instruction to relocate the function for processing the data packets to the target instance. The instruction is received from the arrangement controlling the function. See description above for more details about the receiving in 710.
- 715: (Optional) Transmitting an acknowledgement of the instruction to the arrangement in response to the received instruction.
- 720: Performing the relocation to the target instance in response to the instruction. Performing the relocation to the target instance may comprise transmitting context information related to the processing of the data packets to the target instance, as described previously in the section Specific methods to relocate a function.
- 730: When the relocation is completed, transmitting an indication that the relocation is completed to the arrangement. This may correspond to step 15: Relocation complete in the embodiment of FIG. 5*a*.

In embodiments, the function is comprised in a chain of functions for processing the data packets of the flow. The chain of functions comprises switching elements routing the data packets of the flow between functions of the chain. The chain of functions for processing the data packets may be part of a SDN environment in which the arrangement acts as the SDN controller. The instruction to relocate may comprise an address of the target instance and information related to the routing of the data packets of the flow performed by the switching elements. Performing 720 the relocation may then comprise forwarding the information related to the routing of the data packets of the flow to the target instance using the address of the target instance.

In still another embodiment compatible with the above described embodiments, the device may be associated with more than one flow. The instruction to relocate may therefore comprise information identifying the flow affected by the relocation.

Figure 7C:
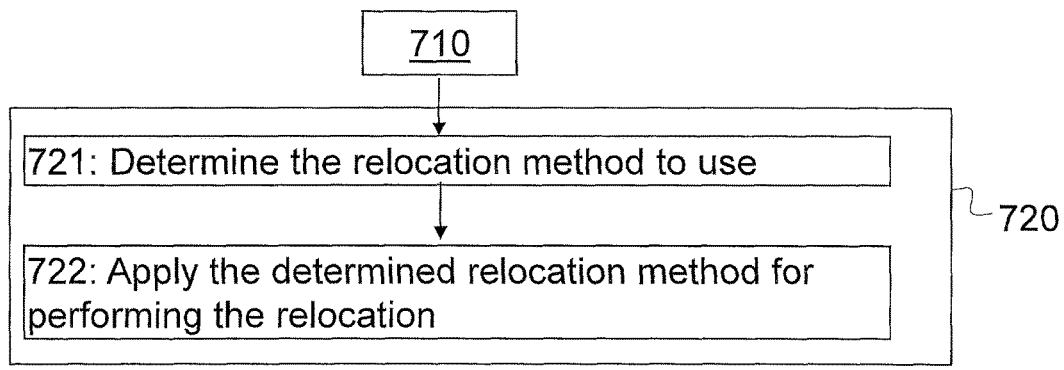

FIG. 7*c* is a flowchart illustrating another embodiment of the method in the source instance 850. The method may comprise:

- 710: Receiving an instruction to relocate the function for processing the data packets to the target instance. The instruction is received from the arrangement controlling the function. See description above for more details about the receiving in 710.
- 720: Performing the relocation to the target instance in response to the instruction which may further comprise determining 721 the relocation method to use, and applying 722 the determined relocation method for performing the relocation.

In one embodiment, the instruction to relocate may comprise information indicating the relocation method to use. The relocation method to use may then be determined 721 based on the instruction.

The relocation method to use may be determined also based on at least one of a capability of the function, a deployment of the function in the communication network, and a characteristic of the data packets of the flow.

In the freeze-move-resume relocation embodiment described above with reference to FIG. 5*b*, applying 722 the determined relocation method may comprise freezing a state related to the processing of the data packets of the flow (see step 15 in FIG. 5*b*), forwarding data packets of the flow to the target instance during the freezing of the state (see step 16 in FIG. 5*b*), and transferring the state to the target instance (see step 20 in FIG. 5*b*). This is done such that the target instance can resume the processing of the data packets of the flow based on the transferred state (see step 21 in FIG. 5*b*) and inform the arrangement that the relocation is completed (see step 22 in FIG. 5*b*).

In the pre-copy relocation embodiment described above with reference to FIG. 5*c*, applying 722 the determined relocation method may further comprise the pre-copying before freezing the state, i.e. copying information elements of the state to the target instance while processing data packets of the flow (see step 15 in FIG. 5*c*). In this embodiment, the transfer of the state to the target instance excludes copied information elements that have not been updated as a result of processing the data packets of the flow.

In the flushing relocation embodiment described above with reference to FIG. 5*e*, the method may comprise, before applying 722 the determined relocation method:

stopping the transfer of data packets of the flow to the source instance, and processing data packets of the flow that remain in a buffer.

This may be combined with any of the above described relocation embodiment.

In the only-new-flows-on-target embodiment described above with reference to FIG. 5*d*, applying 722 the determined relocation method may further comprise continuing the processing of the data packets of the flow at the source instance, forwarding new flows to the target instance, for processing data packets of the new flows at the target instance, and informing the target instance that the flow has ended, such that the target instance can inform the arrangement that the relocation is completed.

Apparatus According to Embodiments

Figure 8A:
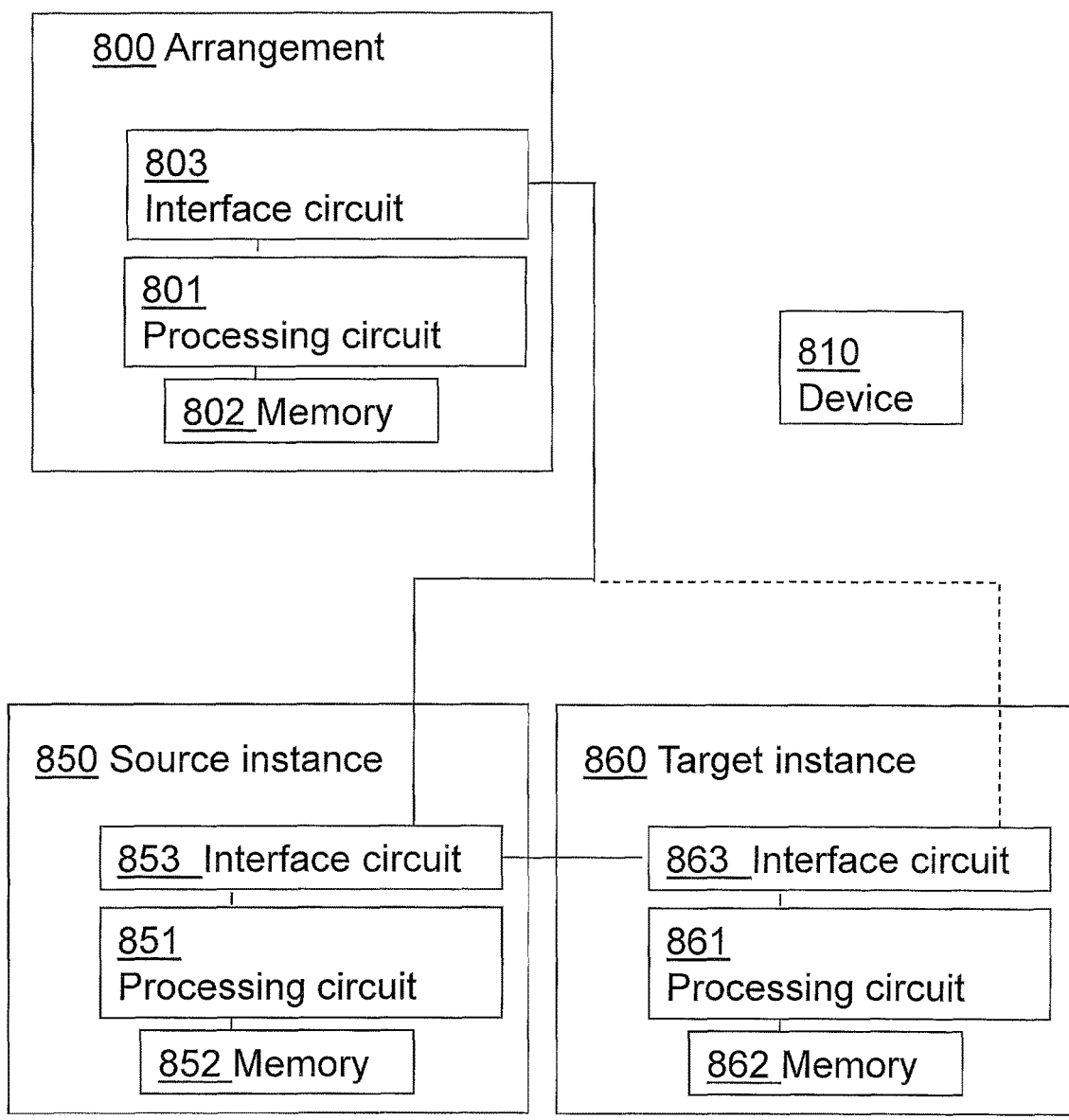
FIGS. 8a-b are block diagrams schematically illustrating the arrangement and the source instance according to some embodiments of the present invention.

An embodiment of an arrangement 800 and a source instance 850 for a communication network is schematically illustrated in the block diagram in FIG. 8*a*. The arrangement 800 is configured to control a function for processing data packets of a flow associated with a device 810. The arrangement is further configured to determine to relocate the function for processing the data packets from the source instance 850 to a target instance 860 for the device. The arrangement is also configured to control transmission of an instruction to relocate the function for processing the data packets to the target instance, the instruction being transmitted to the source instance. The instruction may be transmitted to the source instance either directly or via the target instance. The arrangement is further configured to control an update of a switching element in a chain of functions for processing the data packets of the flow, the chain comprising said function subject to relocation. The switching element affects the routing of the data packets of the flow in the chain, the switching element being updated with information related to the relocated function. The chain of functions for processing data packets may be part of a SDN environment in which the arrangement is configured to act as the SDN controller.

In embodiments, the arrangement 800 may be further configured to control reception of an acknowledgement of the instruction from the source instance, wherein controlling the update is performed in response to receiving the acknowledgement. The arrangement 800 may additionally or alternatively configured to control reception of an indication that the relocation is completed from the source instance or the target instance, wherein controlling the update is performed in response to receiving the indication.

The communication network may be a wireless communication network, and the device may be a wireless device, and the arrangement 800 may be configured to be triggered to determine to relocate the function by a handover decision for the wireless device.

The instruction to relocate may comprises at least one of the following: information related to routing of the data packets of the flow performed by switching elements of the chain of functions; an address of the target instance; and information identifying the flow affected by the relocation.

The arrangement 800 may be further configured to determine the relocation method to use based on at least one of a capability of the function, a deployment of the function in the communication network, and a characteristic of the data packets of the flow, and transmit the instruction to relocate comprising information indicating the relocation method to use.

The arrangement 800 may be configured to update the switching element with one of the following: information indicating a new destination for the routing of the data packets of the flow; information indicating a new pre-defined routing path for the data packets of the flow.

The source instance 850 illustrated in the block diagram in FIG. 8*a*, is configured to relocate a function for processing data packets of a flow associated with the device 810 to a target instance 860 of the communication network. The communication network may be a wireless communication network, and the device may be a wireless device. The function for processing the data packets of the flow is controlled by the arrangement 800 of the communication network. The source instance 850 is configured to receive an instruction to relocate the function for processing the data packets to the target instance. The instruction is received from the arrangement 800 controlling the function. The source instance 850 may be configured to receive the instruction to relocate either directly from the arrangement or via the target instance. The source instance 850 is further configured to perform the relocation to the target instance in response to the instruction.

The source instance may be configured to perform the relocation to the target instance by transmitting context information related to the processing of the data packets to the target instance.

The source instance 850 may be further configured to transmit an acknowledgement of the instruction to the arrangement in response to the received instruction. The source instance 850 may additionally or alternatively be configured to transmit an indication that the relocation is completed to the arrangement when the relocation is completed.

In embodiments, said function to be relocated may be comprised in a chain of functions for processing the data packets of the flow, the chain of functions comprising switching elements routing the data packets of the flow between functions of the chain. The instruction to relocate may comprise an address of the target instance and information related to the routing of the data packets of the flow performed by the switching elements. Furthermore, the source instance 850 may be further configured to perform the relocation by forwarding the information related to the routing of the data packets of the flow to the target instance using the address of the target instance. The chain of functions for processing data packets may be part of a SDN environment in which the arrangement is configured to act as the SDN controller.

In embodiments, the device is associated with more than one flow, and the source instance is configured to receive the instruction to relocate comprising information identifying the flow affected by the relocation.

The source instance 850 may be further configured to perform the relocation by determining the relocation method to use, and applying the determined relocation method for performing the relocation. The source instance 850 may be configured to receive the instruction to relocate comprising information indicating the relocation method to use, and to determine the relocation method to use based on the instruction. The source instance 850 may be further configured to determine the relocation method to use based on at least one of a capability of the function, a deployment of the function in the communication network, and a characteristic of the data packets of the flow.

In one embodiment, the source instance 850 may be further configured to apply the determined relocation method by freezing a state related to the processing of the data packets of the flow, forwarding data packets of the flow to the target instance for processing after freezing the state, and transferring the state to the target instance, such that the target instance can resume the processing of the data packets of the flow based on the transferred state and inform the arrangement that the relocation is completed.

The source instance 850 may be further configured to apply the determined relocation method before freezing the state by copying information elements of the state to the target instance while processing data packets of the flow, and transferring the state to the target instance excluding copied information elements that have not been updated as a result of processing the data packets of the flow.

The source instance 850 may be further configured to, before applying the determined relocation method, stopping the transfer of data packets of the flow to the source instance, and processing data packets of the flow that remain in a buffer.

In another embodiment, the source instance 850 may be further configured to apply the determined relocation method by continuing the processing of the data packets of the flow at the source instance, forwarding new flows to the target instance, for processing data packets of the new flows at the target instance, and informing the target instance that the flow has ended, such that the target instance can inform the arrangement that the relocation is completed.

In embodiments of the invention, the arrangement 800 may comprise a processing circuit 801 and a memory 802 as illustrated in FIG. 8*a*. The arrangement 800 may also comprise an interface circuit 803 configured to communicate with the source and target instances, 850, 860, either directly or by controlling the communication via another node of the communication network. The memory 802 may contain instructions executable by said processing circuit 801 whereby the arrangement 800 is operative to determine to relocate the function for processing the data packets from the source instance 850 to the target instance 860 for the device. The arrangement 800 is further operative to control transmission of an instruction to relocate the function for processing the data packets to the target instance, the instruction being transmitted to the source instance. The arrangement 800 is also operative to control an update of a switching element in a chain of functions for processing the data packets of the flow, the chain comprising said function subject to relocation. The switching element affects the routing of the data packets of the flow in the chain, and the switching element is updated with information related to the relocated function.

Furthermore, the source instance 850 may comprise a processing circuit 851 and a memory 852 as illustrated in FIG. 8a. The source instance 850 may also comprise an interface circuit 853 connected to the processing circuit 851 and configured to communicate with the arrangement 800 either directly or via another node. The memory 852 may contain instructions executable by said processing circuit 851 whereby said source instance 850 is operative to receive an instruction to relocate the function for processing the data packets to the target instance, the instruction being received from the arrangement controlling the function. The source instance is further operative to perform the relocation to the target instance in response to the instruction.

Figure 8B:
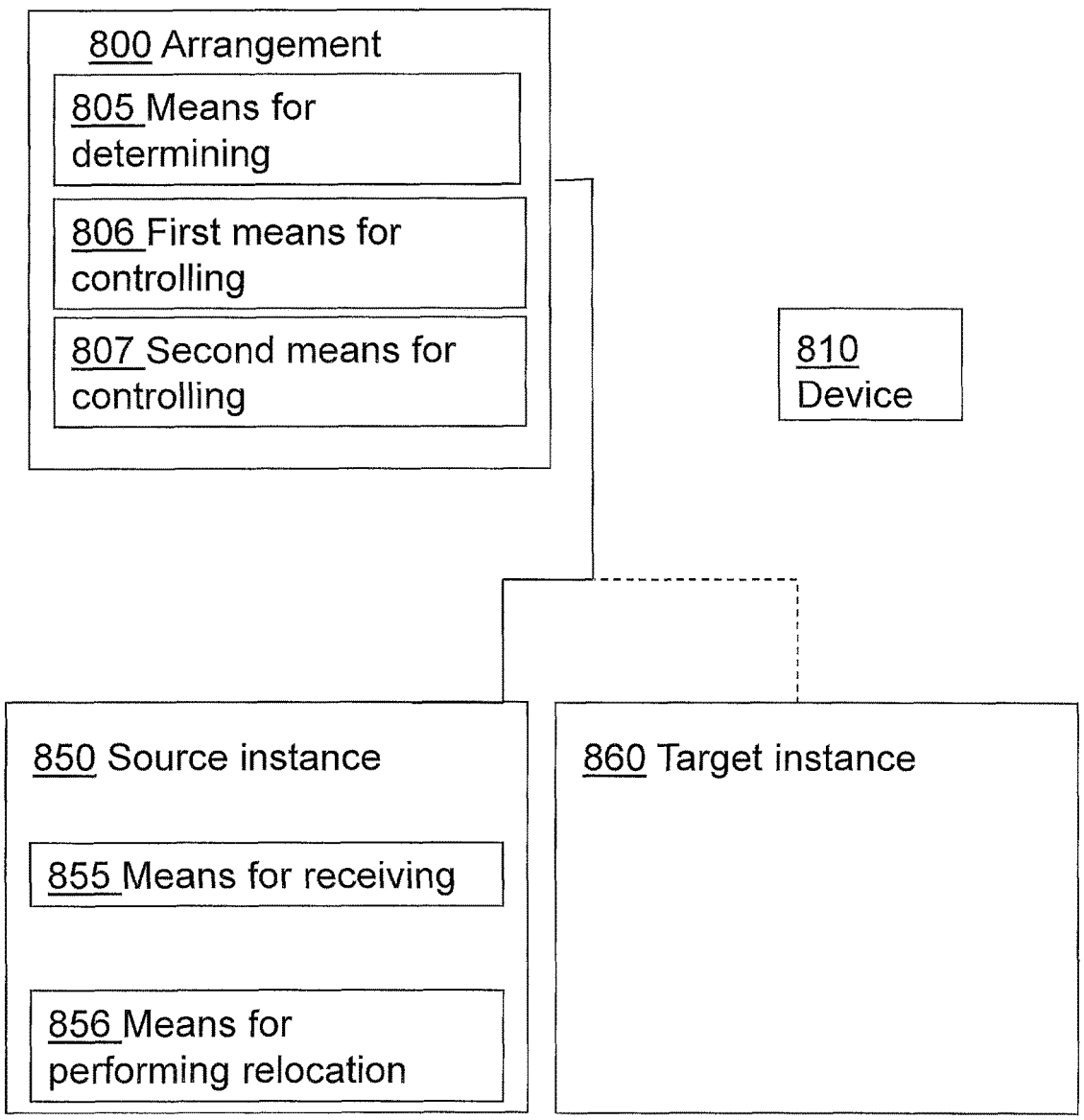

In an alternative way to describe the embodiment in FIG. 8a, illustrated in FIG. 8b, the arrangement 800 may comprise a means for determining 805 adapted to determine to relocate the function for processing the data packets from the source instance 850 to the target instance 860 for the device. The arrangement 800 may also comprise a first means for controlling 806 adapted to control transmission of an instruction to relocate the function for processing the data packets to the target instance, the instruction being transmitted to the source instance. The arrangement 800 may further comprise a second means for controlling 807 adapted to control an update of a switching element in a chain of functions for processing the data packets of the flow, the chain comprising said function subject to relocation. The switching element affects the routing of the data packets of the flow in the chain, and the switching element is updated with information related to the relocated function. Also illustrated in FIG. 8b, the source instance 850 may comprise a means for receiving 855 adapted to receive an instruction to relocate the function for processing the data packets to the target instance, the instruction being received from the arrangement controlling the function. The source instance 850 may also comprise a means for performing 856 adapted to perform the relocation to the target instance in response to the instruction.

The means described above with reference to FIG. 8b are functional units which may be implemented in hardware, software, firmware or any combination thereof. In one embodiment, the means are implemented as a computer program running on a processor.

In still another alternative way to describe the embodiment in FIG. 8a, the arrangement 800 may comprise a Central Processing Unit (CPU) which may be a single unit or a plurality of units. Furthermore, the arrangement may comprise at least one computer program product (CPP) in the form of a non-volatile memory, e.g. an EEPROM (Electrically Erasable Programmable Read-Only Memory), a flash memory or a disk drive. The CPP may comprise a computer program, which comprises code means which when run on the CPU of the arrangement causes the arrangement to perform the methods described earlier in conjunction with FIGS. 6a-b. In other words, when said code means are run on the CPU, they correspond to the processing circuit 801 in FIG. 8a. Furthermore, the source instance 850 may comprise a Central Processing Unit (CPU) which may be a single unit or a plurality of units. Furthermore, the source instance 850 may comprise at least one computer program product (CPP) in the form of a non-volatile memory, e.g. an EEPROM (Electrically Erasable Programmable Read-only Memory), a flash memory or a disk drive. The CPP may comprise a computer program, which comprises code means which when run on the CPU of the source instance 850 causes the source instance to perform the methods described earlier in conjunction with FIGS. 7a-c. In other words, when said code means are run on the CPU, they correspond to the processing circuit 851 in FIG. 8a.

The above mentioned and described embodiments are only given as examples and should not be limiting. Other solutions, uses, objectives, and functions within the scope of the accompanying patent claims may be possible.

The invention claimed is:

1. A method for an apparatus of a communication network, wherein the apparatus controls a function for processing data packets of a flow associated with a device, the method comprising:
   determining to relocate the function for processing the data packets from a source instance to a target instance;
   transmitting to the source instance an instruction to relocate the function for processing the data packets to the target instance;
   receiving, from the source instance or the target instance, an indication that the relocation is completed; and
   in response to receiving the indication that the relocation is completed, causing an update of a switching element in a chain of functions for processing the data packets of the flow, the chain comprising said function, wherein the switching element affects the routing of the data packets of the flow in the chain, the switching element being updated with information related to the relocated function.

2. The method according to claim 1,
   wherein causing an update of a switching element in response to receiving the indication that the relocation is completed comprises transmitting a rule update message to a target base station in response to receiving the indication that the relocation is completed, wherein the rule update message instructs the target base station to forward to the target instance data packets transmitted from the device.

3. The method according to claim 2,
   further comprising the apparatus receiving a handover event message indicating that the device is in the process of being handed over from a source base station to the target base station, wherein the step of determining to relocate the function is performed in response to receiving the handover event message.

4. The method according to claim 1, wherein the communication network is a wireless communication network, and the device is a wireless device.

5. The method according to claim 4, wherein the determining to relocate the function is triggered by a handover decision for the wireless device.

6. The method according to claim 1, wherein the instruction to relocate is transmitted to the source instance either directly or via the target instance.

7. The method according to claim 1, wherein the instruction to relocate comprises at least one of the following: information related to routing of the data packets of the flow performed by switching elements of the chain of functions; an address of the target instance; and information identifying the flow affected by the relocation.

8. The method according to claim 1, further comprising:
   determining the relocation method to use based on at least one of a capability of the function, a deployment of the function in the communication network, and a characteristic of the data packets of the flow,
   and wherein the instruction to relocate comprises information indicating the relocation method to use.

9. The method according to claim 1, wherein the switching element is updated with one of the following:
   information indicating a new destination for the routing of the data packets of the flow;

information indicating a new pre-defined routing path for the data packets of the flow.

10. The method according to claim 1, wherein the chain of functions for processing data packets is part of a software defined networking, SDN, environment in which the apparatus acts as the SDN controller.

11. A computer program product comprising a non-transitory computer readable medium storing a computer program comprising computer readable code which when run on an apparatus causes the apparatus to perform the method of claim 1.

12. A method for relocating a first function for processing data packets associated with a device from a source instance to a target instance of a communication network, wherein the first function for processing the data packets is controlled by an apparatus of the communication network, wherein the method is performed in the source instance and comprises:
receiving an instruction to relocate the first function for processing the data packets to the target instance, the instruction being received from the apparatus controlling the first function,
after receiving the instruction, receiving a data packet associated with the device, and
performing the relocation of the first function to the target instance in response to the instruction, wherein
the step of performing the relocation of the first function to the target instance comprises: 1) transmitting to the target instance a service chain rule identifying a second function, wherein the service chain rule configures the target instance such that, after the target instance receives a second data packet associated with the device, the target instance forwards the received second data packet to the identified second function; and 2) forwarding to the target instance the received first data packet that was received after the instruction was received.

13. The method according to claim 12, wherein performing the relocation to the target instance comprises transmitting context information related to the processing of the data packets to the target instance.

14. The method according to claim 12, further comprising in response to the received instruction:
transmitting an acknowledgement of the instruction to the apparatus.

15. The method according to claim 12, further comprising when the relocation is completed:
transmitting an indication that the relocation is completed to the apparatus.

16. The method according to claim 12, wherein the instruction to relocate is received either directly from the apparatus or via the target instance.

17. The method according to claim 12, wherein said function is comprised in a chain of functions for processing the data packets of the flow, the chain of functions comprising switching elements routing the data packets of the flow between functions of the chain, wherein the instruction to relocate comprises an address of the target instance and information related to the routing of the data packets of the flow performed by the switching elements, and wherein performing the relocation comprises:
forwarding the information related to the routing of the data packets of the flow to the target instance using the address of the target instance.

18. The method according to claim 17, wherein the chain of functions for processing the data packets is part of a software defined networking, SDN, environment in which the apparatus acts as the SDN controller.

19. The method according to claim 12, wherein the device is associated with more than one flow, and wherein the instruction to relocate comprises information identifying the flow affected by the relocation.

20. The method according to claim 12, wherein performing the relocation comprises:
determining the relocation method to use, and
applying the determined relocation method for performing the relocation.

21. The method according to claim 20, wherein the instruction to relocate comprises information indicating the relocation method to use, and wherein the relocation method to use is determined based on the instruction.

22. The method according to claim 20, wherein the relocation method to use is determined based on at least one of a capability of the function, a deployment of the function in the communication network, and a characteristic of the data packets of the flow.

23. The method according to claim 20, wherein applying the determined relocation method comprises:
freezing a state related to the processing of the data packets of the flow,
forwarding data packets of the flow to the target instance during the freezing of the state,
transferring the state to the target instance, such that the target instance can resume the processing of the data packets of the flow based on the transferred state and inform the apparatus that the relocation is completed.

24. The method according to claim 23, wherein applying the determined relocation method further comprises before freezing the state:
copying information elements of the state to the target instance while processing data packets of the flow, and wherein the transfer of the state to the target instance excludes copied information elements that have not been updated as a result of processing the data packets of the flow.

25. The method according to claim 20, further comprising before applying the determined relocation method:
stopping the transfer of data packets of the flow to the source instance,
processing data packets of the flow that remain in a buffer.

26. The method according to claim 20, wherein applying the determined relocation method comprises:
continuing the processing of the data packets of the flow at the source instance,
forwarding new flows to the target instance, for processing data packets of the new flows at the target instance,
informing the target instance that the flow has ended, such that the target instance can inform the apparatus that the relocation is completed.

27. The method according to claim 12, wherein the communication network is a wireless communication network and the device is a wireless device.

28. A computer program product comprising a non-transitory computer readable medium storing a computer program comprising computer readable code which when run on a source instance apparatus causes the source instance apparatus to perform a the method of claim 12.

29. An apparatus for a communication network, wherein the apparatus is configured to control a function for processing data packets of a flow associated with a device, the apparatus being further configured to:
determine to relocate the function for processing the data packets from a source instance to a target instance for the device, control transmission of an instruction to relocate the function for processing the data packets to the target instance, the instruction being transmitted to the source instance, control reception of an indication that the relocation is completed from the source instance or the target instance, and in response to the reception of the indication that the relocation is completed, cause an update of a switching element in a chain of functions for processing the data packets of the flow, the chain comprising said function, wherein the switching element affects the routing of the data packets of the flow in the chain, the switching element being updated with information related to the relocated function.

30. The apparatus according to claim 29, further configured to:

control reception of an acknowledgement of the instruction from the source instance, wherein controlling the update is performed in response to receiving the acknowledgement.

31. The apparatus according to claim 29, further configured to:

control reception of an indication that the relocation is completed from the source instance or the target instance, wherein controlling the update is performed in response to receiving the indication.

32. The apparatus according to claim 29, wherein the communication network is a wireless communication network, and the device is a wireless device.

33. The apparatus according to claim 32, configured to be triggered to determine to relocate the function by a handover decision for the wireless device.

34. The apparatus according to claim 29, configured to transmit the instruction to relocate to the source instance either directly or via the target instance.

35. The apparatus according to claim 29, wherein the instruction to relocate comprises at least one of the following: information related to routing of the data packets of the flow performed by switching elements of the chain of functions; an address of the target instance; and information identifying the flow affected by the relocation.

36. The apparatus according to claim 29, further configured to:

determine the relocation method to use based on at least one of a capability of the function, a deployment of the function in the communication network, and a characteristic of the data packets of the flow, and transmit the instruction to relocate comprising information indicating the relocation method to use.

37. The apparatus according to claim 29, configured to update the switching element with one of the following:

information indicating a new destination for the routing of the data packets of the flow;

information indicating a new pre-defined routing path for the data packets of the flow.

38. The apparatus according to claim 29, wherein the chain of functions for processing data packets is part of a software defined networking, SDN, environment in which the apparatus is configured to act as the SDN controller.

39. The apparatus of claim 29, wherein the apparatus is configured to cause the update of the switching element in response to receiving the indication that the relocation is completed by performing a process comprising transmitting a rule update message to a target base station in response to receiving the indication that the relocation is completed, wherein the rule update message instructs the target base station to forward to the target instance data packets transmitted from the device.

40. A source instance apparatus for a communication network, the source instance apparatus being configured to relocate a first function for processing data packets of a flow associated with a device to a target instance apparatus of the communication network, wherein the first function for processing the data packets of the flow is controlled by an apparatus of the communication network, the source instance apparatus being configured to:

receive an instruction to relocate the first function for processing the data packets to the target instance, after receiving the instruction, receive a data packet associated with the device, and perform the relocation of the first function to the target instance in response to the instruction, wherein the source instance apparatus is configured to perform the relocation of the first function to the target instance by performing a process comprising: 1) transmitting to the target instance a service chain rule identifying a second function, wherein the service chain rule configures the target instance such that, after the target instance receives a data packet associated with the device, the target instance forwards the received data packet to the identified second function; and 2) forwarding the received data packet to the target instance.

41. The source instance apparatus according to claim 40, configured to perform the relocation to the target instance apparatus by transmitting context information related to the processing of the data packets to the target instance apparatus.

42. The source instance apparatus according to claim 40, further configured to:

transmit an acknowledgement of the instruction to the apparatus in response to the received instruction.

43. The source instance apparatus according to claim 40, further configured to when the relocation is completed:

transmit an indication that the relocation is completed to the apparatus.

44. The source instance apparatus according to claim 40, configured to receive the instruction to relocate either directly from the apparatus or via the target instance apparatus.

45. The source instance apparatus according to claim 40, wherein said first function is comprised in a chain of functions for processing the data packets of the flow, the chain of functions comprising switching elements routing the data packets of the flow between functions of the chain, wherein the instruction to relocate comprises an address of the target instance apparatus and information related to the routing of the data packets of the flow performed by the switching elements, and the source instance apparatus being configured to perform the relocation by:

forwarding the information related to the routing of the data packets of the flow to the target instance apparatus using the address of the target instance apparatus.

46. The source instance apparatus according to claim 45, wherein the chain of functions for processing the data packets is part of a software defined networking, SDN, environment in which the apparatus is configured to act as the SDN controller.

47. The source instance apparatus according to claim 40, wherein the device is associated with more than one flow, and wherein the source instance apparatus is configured to receive the instruction to relocate comprising information identifying the flow affected by the relocation.

48. The source instance apparatus according to claim 40, configured to perform the relocation by:
- determining the relocation method to use, and
- applying the determined relocation method for performing the relocation.

49. The source instance apparatus according to claim 48, configured to receive the instruction to relocate comprising information indicating the relocation method to use, and to determine the relocation method to use based on the instruction.

50. The source instance apparatus according to claim 48, configured to determine the relocation method to use based on at least one of a capability of the first function, a deployment of the first function in the communication network, and a characteristic of the data packets of the flow.

51. The source instance apparatus according to claim 48, configured to apply the determined relocation method by:
- freezing a state related to the processing of the data packets of the flow,
- forwarding data packets of the flow to the target instance apparatus during the freezing of the state,
- transferring the state to the target instance apparatus, such that the target instance apparatus can resume the processing of the data packets of the flow based on the transferred state and inform the apparatus that the relocation is completed.

52. The source instance apparatus according to claim 51, configured to apply the determined relocation method before freezing the state by:
- copying information elements of the state to the target instance apparatus while processing data packets of the flow, and transferring the state to the target instance apparatus excluding copied information elements that have not been updated as a result of processing the data packets of the flow.

53. The source instance apparatus according to claim 48, further configured to, before applying the determined relocation method:
- stopping the transfer of data packets of the flow to the source instance apparatus,
- processing data packets of the flow that remain in a buffer.

54. The source instance apparatus according to claim 48, configured to apply the determined relocation method by:
- continuing the processing of the data packets of the flow at the source instance apparatus,
- forwarding new flows to the target instance apparatus, for processing data packets of the new flows at the target instance apparatus,
- informing the target instance apparatus that the flow has ended, such that the target instance apparatus can inform the apparatus that the relocation is completed.

55. The source instance apparatus according to claim 40, wherein the communication network is a wireless communication network and the device is a wireless device.

\* \* \* \* \*